US012775934B2

(12) United States Patent
Kurani

(10) Patent No.: US 12,775,934 B2
(45) Date of Patent: Oct. 27, 2026

(54) MOBILE WALLET ACCOUNT BALANCE SYSTEMS AND METHODS

(71) Applicant: Wells Fargo Bank, N.A., San Francisco, CA (US)

(72) Inventor: Ashish Bhoopen Kurani, Burlingame, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/774,864

(22) Filed: Jul. 16, 2024

(65) Prior Publication Data

US 2024/0370851 A1 Nov. 7, 2024

Related U.S. Application Data

(63) Continuation of application No. 17/893,098, filed on Aug. 22, 2022, now Pat. No. 12,079,803, which is a (Continued)

(51) Int. Cl.
*G06Q 20/36* (2012.01)
*G06Q 20/32* (2012.01)

(52) U.S. Cl.
CPC ....... *G06Q 20/367* (2013.01); *G06Q 20/3221* (2013.01); *G06Q 20/3223* (2013.01)

(58) Field of Classification Search
CPC ............. G06Q 20/367; G06Q 20/3221; G06Q 20/3223; G06Q 20/385; G06Q 20/36
See application file for complete search history.

(56) References Cited

U.S. PATENT DOCUMENTS

| | | | |
|---|---|---|---|
| 5,412,192 | A | 5/1995 | Hoss |
| 5,778,067 | A | 7/1998 | Jones et al. |

(Continued)

FOREIGN PATENT DOCUMENTS

| | | | |
|---|---|---|---|
| JP | 2002-312554 | A | 10/2002 |
| KR | 20090014076 | A | 2/2009 |

(Continued)

OTHER PUBLICATIONS

Systems And Methods For Sorting Alert And Offer Messages On A Mobile Device (Year: 2009).*

(Continued)

*Primary Examiner* — Patrick Mcatee
*Assistant Examiner* — Sima Asgari
(74) *Attorney, Agent, or Firm* — Foley & Lardner LLP

(57) ABSTRACT

A method includes receiving an indication from a user regarding a transaction; automatically selecting, based on a user-defined parameter and the indication from the user, a first account of the user for the transaction; determining that the transaction causes a value of the first account to decrease below a user-defined value. The method includes generating, based on the determination, a screen display including a link associated with a second account of the user; providing, by the computer system, the screen display to a mobile device of the user; receiving a selection of the link associated with the second account. The method includes facilitating, based on receiving the selection of the link, a transfer of an amount of funds from the second account to the first account; and facilitating, based on the transfer of the amount funds from the second account to the first account, the transaction.

20 Claims, 22 Drawing Sheets

Related U.S. Application Data continuation of application No. 16/224,462, filed on Dec. 18, 2018, now Pat. No. 11,423,393, which is a continuation of application No. 14/553,756, filed on Nov. 25, 2014, now Pat. No. 11,288,660, which is a continuation-in-part of application No. 14/501,880, filed on Sep. 30, 2014, now Pat. No. 11,295,294, which is a continuation-in-part of application No. 14/266,580, filed on Apr. 30, 2014, now Pat. No. 9,652,770.

(56) References Cited

U.S. PATENT DOCUMENTS 5,953,710 A 9/1999 Fleming
6,016,484 A 1/2000 Williams et al.
6,018,724 A 1/2000 Arent
6,353,811 B1 3/2002 Weissman
6,615,194 B1 9/2003 Deutsch et al.
6,865,547 B1 3/2005 Brake et al.
6,873,974 B1 3/2005 Schutzer
6,993,510 B2 1/2006 Guy et al.
7,086,586 B1 8/2006 Sullivan
7,254,222 B1 * 8/2007 Bauer ................. H04M 15/774 379/120
7,287,695 B2 10/2007 Wankmueller
7,395,243 B1 7/2008 Zeilke et al.
7,398,919 B2 7/2008 Cooper
7,400,883 B2 7/2008 Rivers et al.
7,631,803 B2 12/2009 Peyret et al.
7,757,944 B2 7/2010 Cline et al.
7,765,481 B2 7/2010 Dixon et al.
7,774,274 B2 8/2010 Jones et al.
7,822,206 B2 10/2010 Birk et al.
7,827,057 B1 11/2010 Walker et al.
7,860,790 B2 12/2010 Monk
7,909,243 B2 3/2011 Merkow et al.
7,925,285 B2 4/2011 Indirabhai
7,930,225 B2 4/2011 Wahlberg et al.
7,945,776 B1 5/2011 Atzmony et al.
7,958,049 B2 6/2011 Jamison et al.
7,970,669 B1 6/2011 Santos
8,019,365 B2 9/2011 Fisher
8,078,140 B2 12/2011 Baker et al.
8,126,806 B1 2/2012 Dimartino et al.
8,160,959 B2 4/2012 Rackley et al.
8,215,560 B2 7/2012 Granucci et al.
8,280,788 B2 10/2012 Perlman
8,332,290 B1 12/2012 Venturo et al.
8,401,904 B1 3/2013 Simakov et al.
8,433,657 B2 4/2013 Dinan
8,452,257 B2 5/2013 Granucci et al.
8,467,766 B2 6/2013 Rackley et al.
8,468,587 B2 6/2013 Blinn et al.
8,489,067 B2 7/2013 Rackley, III et al.
8,504,699 B2 8/2013 Vaughan et al.
8,533,123 B2 9/2013 Hart
8,538,845 B2 9/2013 Liberty
8,548,908 B2 10/2013 Friedman
8,548,926 B2 10/2013 Balistierri et al.
8,555,361 B2 10/2013 Nakhjiri et al.
8,566,237 B2 10/2013 Forzley
8,566,239 B2 10/2013 Arthur et al.
8,571,953 B2 10/2013 Gopalakrishnan et al.
8,577,803 B2 11/2013 Chatterjee et al.
8,589,290 B2 11/2013 Baskerville
8,615,468 B2 12/2013 Varadarajan
8,626,632 B1 1/2014 Dolan et al.
8,627,424 B1 1/2014 O'Malley et al.
8,635,131 B1 1/2014 Saunders
8,639,621 B1 1/2014 Ellis et al.
8,645,971 B2 2/2014 Carlson et al.
8,676,704 B2 3/2014 Ledbetter et al.
8,682,802 B1 3/2014 Kannanari
8,700,729 B2 4/2014 Dua
8,706,628 B2 4/2014 Phillips
8,725,576 B2 5/2014 Fisher
8,725,577 B2 5/2014 Fisher
8,732,080 B2 5/2014 Karim
8,744,966 B1 6/2014 Amacker et al.
8,750,901 B1 6/2014 Gupta et al.
8,762,265 B2 6/2014 Kessler et al.
8,762,270 B1 6/2014 Evans et al.
8,768,830 B1 7/2014 Jorgensen et al.
8,768,834 B2 7/2014 Zacarias et al.
8,774,781 B1 7/2014 Speiser et al.
8,781,955 B2 7/2014 Schamer et al.
8,831,667 B2 * 9/2014 Blanz ....................... H04B 7/04 370/252
8,831,677 B2 9/2014 Villa-Real
8,838,501 B1 9/2014 Priebatsch
8,843,125 B2 9/2014 Kwon et al.
8,843,417 B2 9/2014 Hammad
8,880,432 B2 11/2014 Collins, Jr.
8,924,246 B1 12/2014 Chen et al.
8,925,805 B2 1/2015 Grigg et al.
8,930,271 B1 1/2015 Ellis et al.
8,972,297 B2 3/2015 Kay et al.
8,977,251 B2 3/2015 Grigg et al.
8,989,712 B2 * 3/2015 Wentker .................. H04W 4/80 455/414.1
9,020,836 B2 4/2015 Fisher et al.
9,026,460 B2 5/2015 Grigg et al.
9,027,109 B2 5/2015 Wolberg-Stok et al.
9,031,880 B2 5/2015 Bishop et al.
9,037,509 B1 5/2015 Ellis et al.
9,043,240 B2 5/2015 Langus et al.
9,043,605 B1 5/2015 Machani
9,098,190 B2 8/2015 Zhou et al.
9,111,266 B2 8/2015 Kessler et al.
9,117,242 B1 8/2015 Ellis et al.
9,177,307 B2 * 11/2015 Ross ...................... G06Q 20/20
9,195,984 B1 11/2015 Spector et al.
9,208,488 B2 12/2015 Liberty
9,208,528 B2 12/2015 Chelst et al.
9,218,624 B2 12/2015 Moghadam
9,256,876 B2 2/2016 Vasant Akole et al.
9,286,606 B2 3/2016 Diamond
9,317,849 B2 4/2016 Pitroda et al.
9,324,068 B2 4/2016 Soundararajan
9,361,616 B2 6/2016 Zhou et al.
9,424,572 B2 8/2016 Bondesen et al.
9,473,491 B1 10/2016 Johansson et al.
9,652,770 B1 5/2017 Kurani et al.
9,659,312 B1 5/2017 Ellis et al.
9,691,058 B2 6/2017 Epler et al.
9,704,157 B1 7/2017 Ellis et al.
9,741,051 B2 8/2017 Carpenter et al.
9,785,934 B2 10/2017 Davis et al.
9,805,363 B1 10/2017 Rudnick et al.
9,818,109 B2 11/2017 Loh
9,836,739 B1 * 12/2017 Borovsky .......... G06Q 20/3572
9,928,518 B1 3/2018 Vippagunta et al.
9,972,047 B1 5/2018 Elliott et al.
10,019,740 B2 7/2018 Simantov et al.
10,115,112 B2 10/2018 Fordyce, III
10,121,129 B2 11/2018 Kalgi
10,140,615 B2 11/2018 Carpenter et al.
10,169,812 B1 1/2019 Bajgier et al.
10,223,710 B2 3/2019 Purves et al.
10,235,668 B1 3/2019 Ellis et al.
10,242,368 B1 3/2019 Poole
10,380,583 B1 8/2019 Ellis et al.
10,380,596 B1 8/2019 Butler et al.
10,395,247 B2 8/2019 Gilliam et al.
10,402,897 B1 9/2019 Czyzewski et al.
10,445,739 B1 10/2019 Sahni et al.
10,467,615 B1 11/2019 Omojola et al.
10,515,356 B2 12/2019 Cronic et al.
10,565,558 B2 2/2020 Fredericks et al.
10,586,236 B2 3/2020 Pourfallah et al.
10,600,128 B2 3/2020 Graham et al.
10,692,059 B1 6/2020 Thome et al.
10,817,950 B1 10/2020 Iqbal et al.

(56) References Cited

U.S. PATENT DOCUMENTS

| | | | | |
|---|---|---|---|---|
| 10,853,787 | B1 | 12/2020 | Mango | |
| 10,887,301 | B1 | 1/2021 | Vera et al. | |
| 10,997,592 | B1 | 5/2021 | Kurani | |
| 11,042,882 | B2 | 6/2021 | Ledford et al. | |
| 11,068,866 | B1 | 7/2021 | Hecht et al. | |
| 11,144,902 | B2 | 10/2021 | Gaddam et al. | |
| 11,151,546 | B2 | 10/2021 | Mossoba et al. | |
| 11,210,715 | B2 | 12/2021 | Lindsey et al. | |
| 11,228,660 | B2 | 1/2022 | Rapaka et al. | |
| 11,270,293 | B2 | 3/2022 | Salama et al. | |
| 11,288,660 | B1 | 3/2022 | Kurani | |
| 11,295,294 | B1 | 4/2022 | Kurani et al. | |
| 11,334,579 | B1 * | 5/2022 | Quade | G06Q 40/12 |
| 11,416,766 | B2 | 8/2022 | Chao et al. | |
| 11,422,393 | B2 | 8/2022 | Stray et al. | |
| 11,436,581 | B1 | 9/2022 | Walker et al. | |
| 2002/0032602 | A1 | 3/2002 | Lanzillo et al. | |
| 2002/0052852 | A1 | 5/2002 | Bozeman | |
| 2002/0062249 | A1 | 5/2002 | Iannacci | |
| 2002/0174016 | A1 | 11/2002 | Cuervo | |
| 2002/0198829 | A1 | 12/2002 | Ludwig et al. | |
| 2003/0028481 | A1 | 2/2003 | Flitcroft et al. | |
| 2003/0040964 | A1 | 2/2003 | Lacek | |
| 2003/0055785 | A1 | 3/2003 | Lahiri | |
| 2003/0056096 | A1 | 3/2003 | Albert et al. | |
| 2003/0172039 | A1 | 9/2003 | Guy et al. | |
| 2004/0088349 | A1 | 5/2004 | Beck et al. | |
| 2004/0230535 | A1 | 11/2004 | Binder et al. | |
| 2004/0236632 | A1 | 11/2004 | Maritzen et al. | |
| 2004/0254848 | A1 | 12/2004 | Golan et al. | |
| 2004/0260646 | A1 | 12/2004 | Berardi et al. | |
| 2005/0021401 | A1 | 1/2005 | Postrel | |
| 2005/0021457 | A1 | 1/2005 | Johnson et al. | |
| 2005/0043997 | A1 | 2/2005 | Sahota et al. | |
| 2005/0077350 | A1 | 4/2005 | Courtion et al. | |
| 2005/0086492 | A1 | 4/2005 | Nicodemus et al. | |
| 2005/0125317 | A1 | 6/2005 | Winkelman et al. | |
| 2005/0125668 | A1 | 6/2005 | Botz | |
| 2005/0133590 | A1 | 6/2005 | Rettenmyer et al. | |
| 2005/0138377 | A1 | 6/2005 | First et al. | |
| 2005/0184145 | A1 | 8/2005 | Law et al. | |
| 2005/0235363 | A1 | 10/2005 | Hibbard et al. | |
| 2006/0129502 | A1 | 6/2006 | Pastusiak et al. | |
| 2006/0229985 | A1 | 10/2006 | Lalwani et al. | |
| 2006/0235795 | A1 | 10/2006 | Johnson et al. | |
| 2006/0253335 | A1 | 11/2006 | Keena et al. | |
| 2007/0125840 | A1 | 6/2007 | Law | |
| 2007/0162369 | A1 | 7/2007 | Hardison | |
| 2007/0168354 | A1 | 7/2007 | Ramer et al. | |
| 2007/0170243 | A1 | 7/2007 | Desany et al. | |
| 2007/0174166 | A1 | 7/2007 | Jones | |
| 2007/0174873 | A1 | 7/2007 | Griggs | |
| 2007/0198432 | A1 | 8/2007 | Pitroda | |
| 2007/0199061 | A1 | 8/2007 | Byres et al. | |
| 2007/0244811 | A1 | 10/2007 | Tumminaro | |
| 2007/0250923 | A1 | 10/2007 | M'Raihi | |
| 2007/0262140 | A1 | 11/2007 | Long | |
| 2008/0005006 | A1 | 1/2008 | Tritt et al. | |
| 2008/0006685 | A1 * | 1/2008 | Rackley, III | G06Q 40/00 235/379 |
| 2008/0033878 | A1 | 2/2008 | Krikorian et al. | |
| 2008/0040265 | A1 | 2/2008 | Rackley, III et al. | |
| 2008/0127317 | A1 | 5/2008 | Nakhjiri | |
| 2008/0203152 | A1 | 8/2008 | Hammad et al. | |
| 2008/0208742 | A1 | 8/2008 | Arthur et al. | |
| 2008/0242274 | A1 | 10/2008 | Swanburg et al. | |
| 2008/0243701 | A1 | 10/2008 | Von Mueller | |
| 2008/0294556 | A1 | 11/2008 | Anderson | |
| 2008/0319887 | A1 | 12/2008 | Pizzi et al. | |
| 2009/0027191 | A1 | 1/2009 | Farah et al. | |
| 2009/0043695 | A1 | 2/2009 | Hickey | |
| 2009/0048971 | A1 | 2/2009 | Hathaway et al. | |
| 2009/0076950 | A1 | 3/2009 | Chang et al. | |
| 2009/0106558 | A1 | 4/2009 | Delgrosso et al. | |
| 2009/0157531 | A1 | 6/2009 | Bui | |
| 2009/0177563 | A1 | 7/2009 | Bernstein et al. | |
| 2009/0192873 | A1 | 7/2009 | Marble | |
| 2009/0228384 | A1 | 9/2009 | Melik-Aslanian et al. | |
| 2009/0228966 | A1 | 9/2009 | Parfene et al. | |
| 2009/0271287 | A1 | 10/2009 | Halpern | |
| 2009/0281941 | A1 | 11/2009 | Worth | |
| 2009/0281951 | A1 | 11/2009 | Shakkarwar | |
| 2009/0319409 | A1 | 12/2009 | Omidyar | |
| 2009/0319427 | A1 | 12/2009 | Gardner et al. | |
| 2009/0327010 | A1 | 12/2009 | Vadhri | |
| 2009/0327151 | A1 | 12/2009 | Carlson et al. | |
| 2010/0057553 | A1 | 3/2010 | Ameiss et al. | |
| 2010/0063906 | A1 | 3/2010 | Nelsen et al. | |
| 2010/0076833 | A1 * | 3/2010 | Nelsen | G06Q 20/357 705/26.1 |
| 2010/0082481 | A1 | 4/2010 | Lin et al. | |
| 2010/0088188 | A1 | 4/2010 | Kumar et al. | |
| 2010/0114724 | A1 | 5/2010 | Ghosh et al. | |
| 2010/0114731 | A1 | 5/2010 | Kingston et al. | |
| 2010/0114733 | A1 | 5/2010 | Collas et al. | |
| 2010/0125495 | A1 | 5/2010 | Smith et al. | |
| 2010/0125510 | A1 | 5/2010 | Smith et al. | |
| 2010/0131415 | A1 | 5/2010 | Sartipi | |
| 2010/0191602 | A1 | 7/2010 | Mikkelsen et al. | |
| 2010/0205077 | A1 | 8/2010 | Hammad | |
| 2010/0274655 | A1 | 10/2010 | Postrel | |
| 2010/0280896 | A1 | 11/2010 | Postrel | |
| 2010/0325048 | A1 | 12/2010 | Carlson et al. | |
| 2010/0332386 | A1 | 12/2010 | Vancini et al. | |
| 2011/0055080 | A1 | 3/2011 | Ahlers et al. | |
| 2011/0071914 | A1 | 3/2011 | Beasley et al. | |
| 2011/0106601 | A1 | 5/2011 | Perlman et al. | |
| 2011/0106674 | A1 | 5/2011 | Perlman | |
| 2011/0137797 | A1 | 6/2011 | Stals et al. | |
| 2011/0145149 | A1 | 6/2011 | Valdes et al. | |
| 2011/0153397 | A1 | 6/2011 | Wagenheim | |
| 2011/0153498 | A1 | 6/2011 | Makhotin et al. | |
| 2011/0154466 | A1 | 6/2011 | Harper et al. | |
| 2011/0166998 | A1 | 7/2011 | Hardison | |
| 2011/0191160 | A1 | 8/2011 | Blackhurst et al. | |
| 2011/0196782 | A1 | 8/2011 | Allen et al. | |
| 2011/0251892 | A1 | 10/2011 | Laracey | |
| 2011/0270665 | A1 | 11/2011 | Kim et al. | |
| 2011/0270748 | A1 | 11/2011 | Graham et al. | |
| 2011/0270749 | A1 | 11/2011 | Bennett et al. | |
| 2011/0276489 | A1 | 11/2011 | Larkin | |
| 2011/0289004 | A1 | 11/2011 | Prakash et al. | |
| 2011/0295748 | A1 | 12/2011 | Woodriffe | |
| 2011/0295749 | A1 | 12/2011 | Scalisi | |
| 2011/0302084 | A1 | 12/2011 | Melik-Aslanian et al. | |
| 2011/0313918 | A1 | 12/2011 | Lawson et al. | |
| 2012/0011063 | A1 | 1/2012 | Killian et al. | |
| 2012/0018511 | A1 | 1/2012 | Hammad | |
| 2012/0022944 | A1 | 1/2012 | Volpi | |
| 2012/0078735 | A1 | 3/2012 | Bauer et al. | |
| 2012/0078751 | A1 | 3/2012 | Macphail et al. | |
| 2012/0084210 | A1 | 4/2012 | Farahmand | |
| 2012/0110634 | A1 | 5/2012 | Jakobsson | |
| 2012/0130731 | A1 | 5/2012 | Canetto | |
| 2012/0130887 | A1 | 5/2012 | Meckling | |
| 2012/0143705 | A1 | 6/2012 | Bhattacharya et al. | |
| 2012/0150669 | A1 * | 6/2012 | Langley | G06Q 20/356 705/16 |
| 2012/0150687 | A1 | 6/2012 | Hart | |
| 2012/0158589 | A1 | 6/2012 | Katzin et al. | |
| 2012/0185317 | A1 | 7/2012 | Wong | |
| 2012/0185387 | A1 | 7/2012 | Doyle | |
| 2012/0192254 | A1 | 7/2012 | Garcia Perez et al. | |
| 2012/0196586 | A1 | 8/2012 | Grigg et al. | |
| 2012/0197793 | A1 | 8/2012 | Grigg et al. | |
| 2012/0197794 | A1 | 8/2012 | Grigg et al. | |
| 2012/0209749 | A1 | 8/2012 | Hammad et al. | |
| 2012/0233005 | A1 | 9/2012 | White | |
| 2012/0239417 | A1 | 9/2012 | Pourfallah et al. | |
| 2012/0253852 | A1 | 10/2012 | Pourfallah et al. | |
| 2012/0253913 | A1 | 10/2012 | Richard | |
| 2012/0254021 | A1 | 10/2012 | Wohied et al. | |
| 2012/0271705 | A1 | 10/2012 | Postrel | |
| 2012/0271712 | A1 | 10/2012 | Katzin et al. | |

(56) References Cited

U.S. PATENT DOCUMENTS

2012/0284130 A1 11/2012 Lewis et al.
2012/0284195 A1 11/2012 Mcmillen et al.
2012/0290376 A1 11/2012 Dryer et al.
2012/0296720 A1 11/2012 Pirillo
2012/0301774 A1 11/2012 Jiang et al.
2012/0303425 A1 11/2012 Katzin et al.
2012/0310774 A1* 12/2012 Chassin ............... G06Q 20/227 705/42
2012/0323717 A1 12/2012 Kirsch
2012/0323762 A1 12/2012 Kapur et al.
2012/0323783 A1* 12/2012 Canetto .............. G06Q 20/4016 705/44
2012/0330837 A1 12/2012 Persaud et al.
2013/0006848 A1 1/2013 Kuttuva
2013/0013499 A1 1/2013 Kalgi
2013/0013509 A1 1/2013 Perlman et al.
2013/0018777 A1 1/2013 Klein
2013/0018786 A1 1/2013 Sher
2013/0018791 A1 1/2013 Mendicino et al.
2013/0018792 A1 1/2013 Casey et al.
2013/0024364 A1 1/2013 Shrivastava et al.
2013/0030941 A1 1/2013 Meredith et al.
2013/0042261 A1 2/2013 Tavormina et al.
2013/0046697 A1 2/2013 Schibuk
2013/0054336 A1 2/2013 Graylin
2013/0054454 A1 2/2013 Purves et al.
2013/0054469 A1 2/2013 Agashe et al.
2013/0060679 A1 3/2013 Oskolkov et al.
2013/0060689 A1 3/2013 Oskolkov et al.
2013/0060696 A1 3/2013 Martin et al.
2013/0060708 A1 3/2013 Oskolkov et al.
2013/0065555 A1 3/2013 Baker et al.
2013/0073365 A1 3/2013 Mccarthy
2013/0073459 A1 3/2013 Zacarias et al.
2013/0074168 A1 3/2013 Hao et al.
2013/0080241 A1 3/2013 Fisher
2013/0080323 A1 3/2013 Scipioni
2013/0110628 A1 5/2013 Yeo et al.
2013/0110658 A1 5/2013 Lyman et al.
2013/0132275 A1 5/2013 Enzaldo et al.
2013/0132854 A1 5/2013 Raleigh et al.
2013/0143089 A1 6/2013 Teshima et al.
2013/0144663 A1 6/2013 Qawami et al.
2013/0144702 A1 6/2013 Tabor et al.
2013/0151400 A1 6/2013 Makhotin et al.
2013/0166332 A1 6/2013 Hammad
2013/0168450 A1 7/2013 Von Mueller et al.
2013/0173456 A1 7/2013 Grigg et al.
2013/0173474 A1 7/2013 Ranganathan et al.
2013/0179336 A1 7/2013 Lyons et al.
2013/0179352 A1 7/2013 Dwyre et al.
2013/0185167 A1 7/2013 Mestre et al.
2013/0191227 A1* 7/2013 Pasa ..................... G06Q 20/027 705/41
2013/0191277 A1 7/2013 O'Leary et al.
2013/0191278 A1 7/2013 O'Leary et al.
2013/0200999 A1 8/2013 Spodak et al.
2013/0204785 A1 8/2013 Monk et al.
2013/0226720 A1 8/2013 Ahluwalia et al.
2013/0226751 A1 8/2013 Friedholm et al.
2013/0226799 A1 8/2013 Raj
2013/0232032 A1 9/2013 Chaturvedi et al.
2013/0238455 A1 9/2013 Laracey
2013/0246258 A1 9/2013 Dessert
2013/0246260 A1 9/2013 Barten et al.
2013/0246261 A1 9/2013 Purves et al.
2013/0246265 A1 9/2013 Al-Sahli
2013/0254028 A1 9/2013 Salci
2013/0254102 A1 9/2013 Royyuru
2013/0254114 A1 9/2013 Smith
2013/0254115 A1 9/2013 Pasa et al.
2013/0260734 A1 10/2013 Jain et al.
2013/0262309 A1 10/2013 Gadotti
2013/0262316 A1 10/2013 Hruska
2013/0262317 A1 10/2013 Collinge et al.
2013/0275250 A1 10/2013 Rodell et al.
2013/0282588 A1 10/2013 Hruska
2013/0290121 A1 10/2013 Simakov et al.
2013/0290169 A1 10/2013 Bathula et al.
2013/0290176 A1 10/2013 Tirumalashetty
2013/0297425 A1 11/2013 Wallaja
2013/0297486 A1 11/2013 Colborn
2013/0297513 A1 11/2013 Kirillin et al.
2013/0304559 A1 11/2013 Stone et al.
2013/0304642 A1 11/2013 Campos
2013/0317928 A1 11/2013 Laracey
2013/0317984 A1 11/2013 O'Leary et al.
2013/0332344 A1 12/2013 Weber
2013/0332353 A1 12/2013 Aidasani et al.
2013/0346302 A1* 12/2013 Purves ................. G06Q 20/102 705/40
2014/0006129 A1 1/2014 Heath
2014/0006194 A1 1/2014 Xie et al.
2014/0006276 A1 1/2014 Grigg et al.
2014/0006277 A1* 1/2014 Rao .................... G06Q 20/3572 705/41
2014/0012689 A1 1/2014 Henderson et al.
2014/0012750 A1 1/2014 Kuhn et al.
2014/0019352 A1 1/2014 Shrivastava
2014/0019360 A1 1/2014 Yang
2014/0038546 A1 2/2014 Neal et al.
2014/0040139 A1 2/2014 Brudnicki et al.
2014/0052617 A1 2/2014 Chawla et al.
2014/0058855 A1 2/2014 Hussein et al.
2014/0058936 A1 2/2014 Ren et al.
2014/0058938 A1 2/2014 Mcclung, III
2014/0067677 A1 3/2014 Ali et al.
2014/0074569 A1 3/2014 Francis et al.
2014/0074581 A1 3/2014 Johnson et al.
2014/0074637 A1 3/2014 Hammad
2014/0074655 A1 3/2014 Lim et al.
2014/0074724 A1 3/2014 Gordon et al.
2014/0081783 A1 3/2014 Paranjape et al.
2014/0081854 A1 3/2014 Sanchez et al.
2014/0089171 A1 3/2014 Gandhi
2014/0089195 A1 3/2014 Ward et al.
2014/0096215 A1 4/2014 Hessler
2014/0100975 A1 4/2014 Van
2014/0101034 A1* 4/2014 Tanner ................... G06Q 20/10 705/39
2014/0101048 A1 4/2014 Gardiner et al.
2014/0108254 A1 4/2014 Lee
2014/0108263 A1 4/2014 Ortiz et al.
2014/0109200 A1 4/2014 Tootill et al.
2014/0114856 A1 4/2014 Jung et al.
2014/0118704 A1 5/2014 Duelli et al.
2014/0122310 A1 5/2014 Torrens et al.
2014/0122563 A1 5/2014 Singh et al.
2014/0129357 A1 5/2014 Goodwin
2014/0129433 A1 5/2014 Rosenberger
2014/0129442 A1 5/2014 Hanson et al.
2014/0136352 A1 5/2014 Ramakrishna et al.
2014/0143089 A1 5/2014 Campos et al.
2014/0180849 A1 6/2014 Kimberg et al.
2014/0188586 A1 7/2014 Carpenter et al.
2014/0188704 A1 7/2014 Grossman et al.
2014/0188718 A1 7/2014 Grossman et al.
2014/0188719 A1 7/2014 Poornachandran et al.
2014/0195425 A1* 7/2014 Campos ............. G06Q 20/4018 705/41
2014/0201086 A1 7/2014 Gadotti et al.
2014/0207680 A1 7/2014 Rephlo
2014/0210321 A1 7/2014 Dixon
2014/0214640 A1 7/2014 Mallikarjunan et al.
2014/0222670 A1 8/2014 Concannon
2014/0236792 A1 8/2014 Pant et al.
2014/0244506 A1 8/2014 Gramling
2014/0249948 A1 9/2014 Graylin et al.
2014/0250003 A1 9/2014 Levchin et al.
2014/0258135 A1 9/2014 Park et al.
2014/0278892 A1 9/2014 Collart
2014/0279097 A1 9/2014 Alshobaki et al.
2014/0279459 A1 9/2014 Weiss et al.
2014/0279469 A1 9/2014 Mendes

(56) References Cited

U.S. PATENT DOCUMENTS

2014/0279489 A1 9/2014 Russell et al.
2014/0279559 A1 9/2014 Smith et al.
2014/0279566 A1 9/2014 Verma et al.
2014/0282068 A1 9/2014 Levkovitz et al.
2014/0297435 A1 10/2014 Wong
2014/0297520 A1 10/2014 Levchin et al.
2014/0297524 A1 10/2014 Ravindranath et al.
2014/0304095 A1 10/2014 Fisher
2014/0304187 A1 10/2014 Menn
2014/0310173 A1 10/2014 Caldwell
2014/0310182 A1 10/2014 Cummins
2014/0337175 A1 11/2014 Katzin et al.
2014/0337621 A1 11/2014 Nakhimov
2014/0344153 A1 11/2014 Raj et al.
2014/0347265 A1 11/2014 Aimone et al.
2014/0351072 A1 11/2014 Wieler et al.
2014/0351126 A1 11/2014 Priebatsch
2014/0351130 A1 11/2014 Cheek et al.
2014/0365322 A1 12/2014 Phillips
2014/0365363 A1 12/2014 Knudsen et al.
2014/0376576 A1 12/2014 Jespersen et al.
2014/0379576 A1 12/2014 Marx et al.
2015/0019944 A1 1/2015 Kalgi
2015/0026049 A1 1/2015 Theurer et al.
2015/0032626 A1 1/2015 Dill et al.
2015/0032627 A1 1/2015 Dill et al.
2015/0035643 A1 2/2015 Kursun
2015/0039462 A1 2/2015 Shastry et al.
2015/0046241 A1 2/2015 Salmon et al.
2015/0046339 A1 2/2015 Wong et al.
2015/0066790 A1 3/2015 Desanti
2015/0074774 A1 3/2015 Nema et al.
2015/0088633 A1 3/2015 Salmon et al.
2015/0089568 A1 3/2015 Sprague et al.
2015/0095075 A1 4/2015 Breuer et al.
2015/0095219 A1 4/2015 Hurley
2015/0100442 A1 4/2015 Van Heerden et al.
2015/0100486 A1 4/2015 Green et al.
2015/0100495 A1 4/2015 Salama et al.
2015/0112781 A1 4/2015 Clark et al.
2015/0120472 A1 4/2015 Aabye et al.
2015/0121063 A1 4/2015 Maller et al.
2015/0134514 A1 5/2015 Chan et al.
2015/0134540 A1 5/2015 Law et al.
2015/0137938 A1 5/2015 Slaby et al.
2015/0140960 A1 5/2015 Powell et al.
2015/0154588 A1 6/2015 Purves et al.
2015/0178693 A1 6/2015 Solis
2015/0178725 A1 6/2015 Poetsch
2015/0186855 A1 7/2015 Bennett et al.
2015/0186871 A1 7/2015 Laracey
2015/0186872 A1 7/2015 Sobol et al.
2015/0186875 A1 7/2015 Zhang et al.
2015/0186886 A1 7/2015 Schwalb et al.
2015/0186952 A1 7/2015 Brown et al.
2015/0187021 A1 7/2015 Moring et al.
2015/0193131 A1 7/2015 Bayer et al.
2015/0193745 A1 7/2015 Handwerger et al.
2015/0193869 A1 7/2015 Del Vecchio et al.
2015/0206105 A1 7/2015 Suzukake
2015/0213435 A1 7/2015 Douglas et al.
2015/0220914 A1 8/2015 Purves et al.
2015/0229622 A1 8/2015 Grigg et al.
2015/0237026 A1 8/2015 Kumar
2015/0242987 A1 8/2015 Lee et al.
2015/0254660 A1 9/2015 Allison et al.
2015/0254663 A1* 9/2015 Bondesen ............ G06Q 20/367
705/44
2015/0254698 A1 9/2015 Bondesen et al.
2015/0254699 A1* 9/2015 Bondesen ............. G06Q 20/20
705/14.17
2015/0278799 A1 10/2015 Palanisamy
2015/0278816 A1 10/2015 Fleishman et al.
2015/0287015 A1 10/2015 Kaplinger et al.
2015/0287037 A1 10/2015 Salmon et al.
2015/0319158 A1 11/2015 Kumnick
2015/0324768 A1 11/2015 Filter et al.
2015/0332252 A1 11/2015 Shahrokhi et al.
2015/0333964 A1 11/2015 Wang et al.
2015/0339662 A1 11/2015 Huang et al.
2015/0339663 A1 11/2015 Lopreiato et al.
2015/0339671 A1 11/2015 Krietzman et al.
2015/0348029 A1 12/2015 Van Os et al.
2015/0363810 A1 12/2015 Kim et al.
2015/0371212 A1 12/2015 Giordano et al.
2015/0371234 A1 12/2015 Huang et al.
2015/0371326 A1 12/2015 Montesano et al.
2016/0004876 A1 1/2016 Bye et al.
2016/0012465 A1 1/2016 Sharp
2016/0026999 A1 1/2016 Kurian
2016/0042341 A1 2/2016 Griffin et al.
2016/0042344 A1 2/2016 Thimmana et al.
2016/0048828 A1 2/2016 Lee
2016/0048929 A1 2/2016 Parento et al.
2016/0054336 A1 2/2016 Anderberg et al.
2016/0063496 A1 3/2016 Royyuru et al.
2016/0065370 A1 3/2016 Le Saint et al.
2016/0071071 A1 3/2016 Lazay
2016/0071074 A1 3/2016 Baird
2016/0071096 A1 3/2016 Rosca
2016/0071097 A1 3/2016 Lazay
2016/0071099 A1 3/2016 Lazay
2016/0071109 A1 3/2016 Lazay
2016/0071110 A1 3/2016 Lazay
2016/0086170 A1 3/2016 Hurt et al.
2016/0086179 A1 3/2016 Barbier
2016/0092696 A1 3/2016 Guglani et al.
2016/0092866 A1 3/2016 Liberty et al.
2016/0092868 A1 3/2016 Salama et al.
2016/0092874 A1 3/2016 O'Regan et al.
2016/0125396 A1 5/2016 Brickell et al.
2016/0125409 A1 5/2016 Meredith et al.
2016/0125417 A1 5/2016 Huang et al.
2016/0132875 A1 5/2016 Blanco et al.
2016/0132884 A1 5/2016 Fridman et al.
2016/0140555 A1 5/2016 Scipioni
2016/0140561 A1 5/2016 Cowan
2016/0162882 A1 6/2016 Mcclung, III
2016/0162889 A1 6/2016 Badenhorst
2016/0180305 A1 6/2016 Dresser et al.
2016/0269416 A1 9/2016 Camenisch et al.
2016/0283925 A1 9/2016 Lavu et al.
2016/0342962 A1 11/2016 Brown et al.
2016/0342992 A1 11/2016 Lee
2016/0343043 A1 11/2016 Hicks et al.
2016/0379215 A1 12/2016 Clerkin
2017/0017958 A1 1/2017 Scott et al.
2017/0061402 A1 3/2017 Mobin et al.
2017/0061406 A1 3/2017 Adams et al.
2017/0061438 A1 3/2017 Patel
2017/0164139 A1 6/2017 Deselaers et al.
2017/0178110 A1 6/2017 Swanson et al.
2017/0185989 A1 6/2017 Bozovich, Jr.
2017/0193468 A1 7/2017 Chougule et al.
2017/0228715 A1 8/2017 Gurunathan
2017/0236118 A1 8/2017 Laracey
2017/0337542 A1 11/2017 Kim et al.
2017/0357969 A1 12/2017 Huang et al.
2017/0357977 A1 12/2017 Pitz et al.
2017/0364914 A1 12/2017 Howard
2018/0007052 A1 1/2018 Quentin
2018/0012203 A1 1/2018 Hall
2018/0032981 A1 2/2018 Shanmugam et al.
2018/0047016 A1 2/2018 Sarin
2018/0068308 A1 3/2018 Gupta et al.
2018/0082283 A1 3/2018 Sharma
2018/0096428 A1 4/2018 Gorenstein
2018/0157336 A1 6/2018 Harris et al.
2018/0219863 A1 8/2018 Tran
2018/0285836 A1 10/2018 Enobakhare
2018/0322488 A1 11/2018 Arana et al.
2018/0324204 A1 11/2018 Mcclory et al.
2018/0365675 A1 12/2018 Sivaraman
2018/0374076 A1 12/2018 Wheeler

(56) References Cited

U.S. PATENT DOCUMENTS

| | | | |
|---|---|---|---|
| 2019/0108505 | A1 | 4/2019 | Perlman |
| 2019/0122222 | A1 | 4/2019 | Uechi |
| 2019/0165942 | A1 | 5/2019 | Subramaniam |
| 2019/0220908 | A1 | 7/2019 | Wilkes |
| 2019/0236577 | A1 | 8/2019 | Schmid et al. |
| 2019/0280863 | A1 | 9/2019 | Meyer et al. |
| 2019/0303803 | A1 | 10/2019 | Buc et al. |
| 2019/0304029 | A1 | 10/2019 | Murray et al. |
| 2019/0385250 | A1 | 12/2019 | Bhattacharjee et al. |
| 2020/0005277 | A1 | 1/2020 | Prabhu et al. |
| 2020/0028753 | A1 | 1/2020 | Powar et al. |
| 2020/0034813 | A1 | 1/2020 | Calinog et al. |
| 2020/0051117 | A1 | 2/2020 | Mitchell |
| 2020/0097957 | A1 | 3/2020 | Driggs et al. |
| 2020/0151706 | A1 | 5/2020 | Mossoba et al. |
| 2020/0175496 | A1 | 6/2020 | Finke et al. |
| 2020/0219060 | A1 | 7/2020 | Fredericks et al. |
| 2020/0279305 | A1 | 9/2020 | Mossoba et al. |
| 2020/0372536 | A1 | 11/2020 | Scislowski et al. |
| 2021/0027291 | A1 | 1/2021 | Ranganathan |
| 2021/0056552 | A1 | 2/2021 | Murray |
| 2021/0110392 | A1 | 4/2021 | Lacoss-Arnold et al. |
| 2021/0158333 | A1 | 5/2021 | Cohen et al. |
| 2021/0166260 | A1 | 6/2021 | Ho et al. |
| 2021/0358754 | A1 | 11/2021 | Masuoka et al. |
| 2021/0398179 | A1 | 12/2021 | Kolaja et al. |
| 2022/0027873 | A1 | 1/2022 | Pathuri et al. |
| 2022/0101609 | A1 | 3/2022 | Hu et al. |
| 2022/0147967 | A1 | 5/2022 | Clark |
| 2022/0210209 | A1 | 6/2022 | Vanbuskirk et al. |
| 2022/0215356 | A1 | 7/2022 | Dakshinyam et al. |

FOREIGN PATENT DOCUMENTS

| | | | |
|---|---|---|---|
| WO | WO-2011/100529 | A1 | 8/2011 |
| WO | WO-2011/113121 | A1 | 9/2011 |
| WO | WO-2011/159842 | A2 | 12/2011 |
| WO | WO-2012/139003 | A2 | 10/2012 |
| WO | WO-2013/044175 | A1 | 3/2013 |
| WO | WO-2013/079793 | A1 | 6/2013 |
| WO | WO-2014/012138 | A1 | 1/2014 |
| WO | WO-2014/111888 | A1 | 7/2014 |
| WO | WO-2014/134180 | A2 | 9/2014 |
| WO | WO-2014/207615 | A1 | 12/2014 |
| WO | WO-2014/210321 | A2 | 12/2014 |
| WO | WO-2015/016780 | A1 | 2/2015 |
| WO | WO-2015/023172 | A2 | 2/2015 |
| WO | WO-2015/054697 | A1 | 4/2015 |
| WO | WO-2016/009198 | A1 | 1/2016 |
| WO | WO-2016/053975 | A1 | 4/2016 |
| WO | WO-2016/097879 | A1 | 6/2016 |
| WO | WO-2016/153977 | A1 | 9/2016 |
| WO | WO-2016/172107 | A1 | 10/2016 |
| WO | WO-2016/196054 | A1 | 12/2016 |
| WO | WO-2017/106309 | A1 | 6/2017 |
| WO | WO-2018/005798 | A1 | 1/2018 |

OTHER PUBLICATIONS

Virtual Wallet Card Selection Apparatuses, Methods And Systems (Year: 2012).*

A System For Payment Via Electronic Wallet (Year: 2012).*

Consumer Device Payment Token Management (Year: 2014).*

"Authors et al., Secure Authorization Token, Sep. 18, 2013, IP.com PAD, entire document" (Year: 2013).

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

"Messages in the SCT interbank space—pacs.008 and pacs.002", Nov. 1, 2017, Paiementor, pp. 1-3 (Year: 2017).

"Wang et al. Mobile payment security, threats, and challenges, Mar. 24, 2016, IEEE Xplore, Entire document" (Year: 2016).

1. Authors: Saygin Baksi et al; Title: Optimal primary-secondary user pairing and power allocation in cognitive cooperative multiple access channels; Date Added to IEEE Xplore: Apr. 10, 2014 (Year: 2014).

2. Authors et al: Tianliang Lei ; Title: Investigation of Cross-Social Network User Identification; Date of Conference: Apr. 21-22, 2022 . (Year: 2022).

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

Advisory Action issued on U.S. Appl. No. 15/392,339 dated Dec. 16, 2021.

Alipay, Alipay Documentation Red Packet QR Code Introduction, printed on Sep. 30, 2019 at Internet address https://intl.alipay.com/doc/redpacket/scrzsv, 2 pages.

Alipay, Trust Makes It Simple, printed on Sep. 30, 2019 from Internet address https://intl.alipay.com/, 3 pages.

Authors et al: Disclosed anonymously, Notifying a User When a Bill is Due Using a Notification On the User's Mobile Device, Oct. 18, 2013 IP.com PAD, entire document (Year: 2013).

Authors et al: Tianliang Lei ; Title: Investigation of Cross-Social Network User Identification; Date of Conference: Apr. 21-22, 2022. (Year: 2022).

Authors et al: Tooba Qasim ; Title: Interactive shopping with mobile wallet; Publisher: IEEE; Date of Conference: Nov. 19-22, 2012. (Year: 2012).

Authors: Mia Olsen et al; Title: e-Wallet Properties; Publisher: IEEE; in 2011 (Year: 2011).

Authors: Saygin Baksi et al; Title: Optimal primary-secondary user pairing and power allocation in cognitive cooperative multiple access channels; Date Added to IEEE Xplore: Apr. 10, 2014 (Year: 2014).

Bravo, Bravo Pay, CrunchBase, printed on Sep. 30, 2019 from Internet address https://www.crunchbase.com/organization/bravo#section-overview, 9 pages.

Bravo, Tip or Pay Your Tour Guide Without Sharing Personal Info, printed on Sep. 30, 2019 from Internet address https://trybravo.com, 4 pages.

Bravo, Trybravo's Competitors, Revenue, Number of Employees, Funding and Acquisitions, printed from Internet address https://www.owler.com/company/trybravo on Sep. 30, 2019, 2 pages.

Dipjar, printed on Sep. 30, 2019 from Internet address https://www.dipjar.com/, 10 pages.

EMV, "Payment Tokenisation Specification Technical Framework", 2014 EMVCO, LLC. 84 pages.

Examiner's Answer issued in U.S. Appl. No. 15/401,664 dated Sep. 23, 2021.

Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).

How to Control Children's Spending on Debit Cards | Money | by Jill Paperworth, May 10, 2009, https:www.theguardian.com/money/2009/mar/ . . . /children-debit-cards-online-spend . . . (Year: 2009).

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).

Kyrillidis, Mayes, Markantonakis; Card-present Transactions On The Internet Using The Smart CardWeb Server; 2013, IEEE; 12th (Year: 2013).

Kyrillidis; Mayes; Markantonakis, Card-present Transactions on the Internet Using the Smart CardWeb Server, 2013, IEEE, 12th, p. 616 (Year: 2013).

Latterell, Kayla, "How Do Gift Cards Work?," https://www.cardsource.com/news/how-do-gift-cards-work, pp. 1-6.

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_

(56) References Cited

OTHER PUBLICATIONS transaction_costs_with_smart_mobile_payments/links/548e9dad0cf225bf66a607bb.pdf on Oct. 30, 2015, 8 pages.
LevelUp, Restaurant Customers Expect Seamless Digital Experiences, printed on Sep. 30, 2019 from Internet address https://www.thelevelup.com/, 4 pages.
N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013,6726503. (Year: 2013).
P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 1109/CEWIT.2013.6713767. (Year: 2013).
P2P-Paid: A Peer-to-Peer Wireless Payment System by Gao et al (Year: 2005).
Polito et al., Inter-provider AAA and Billing of VoIP Users with Token-based Method, Dec. 26, 2007, IEEE Xplore, entire document (Year: 2007).
Ron White, How Computers Work, Oct. 15, 2003, Que, 7th Edition, p. 4. (Year: 2003).
Smart Card Alliance, "The Mobile Payments and NFC Landscape: A U.S. Perspective," Sep. 2011. 53 pages.
Square, Inc., Grow Your Business Your Way With Square Tools, printed on Sep. 30, 2019 from Internet address https://squareup.com/us/en, 8 pages.
The University of Alaska staff, Managing Finance Reports with Vista Plus, Aug. 2008, The University of Alaska, web, 2-20 (Year: 2008).
TSIP, Introducing Helping Heart—A Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.
Uber, How Uber Works, printed on Sep. 30, 2019 from Internet address https://www.uber.com/us/en/about/how-does-uber-work/, 6 pages.
Urien, P., et al., "A breakthrough for prepaid payment: End to end token exchange and management using secure SSL channels created by EAP-TLS smart cards", 2011 International Conference on Collaboration Technologies and Systems (CTS), 2011. (Year: 2011).
W. Adi, A. Al-Qayedi, A. A. Zarooni and A. Mabrouk, "Secured multi-identity mobile infrastructure and offline mobile-assisted micropayment application," 2004 IEEE Wireless Communications and Networking Conference (IEEE Cat. No. 04TH8733), 2004, pp. 879-882 vol. 2, doi: 10.1109/WCNC.2004.1311302. (Year: 2004).
Wazeopedia, Main Page, printed on Sep. 30, 2019 from Internet address https://wazeopedia.waze.com/wiki/USA/Main_Page, 3 pages.
White, Ron, "How Computers Work", Que Publishing, 7th Ed, Oct. 15, 2003, p. 4. 23 pages.
Yang, Ming-Hour. "Security enhanced EMV-based mobile payment protocol." TheScientificWorldJournal vol. 2014 (2014): 864571. Doi: 10.115/2014/864571 (Year: 2014).
Grillo, Antonio, et al. "High-capacity colored two-dimensional codes." Proceedings of the international multiconference on computer science and information technology. IEEE, 2010. (Year: 2010).

* cited by examiner

FIG. 3A
321
Verizon
2:37 PM
61%
Rdio
Settings
Letterpress
Flipboard
Clock
Cash
Spark
Wells Fargo
Level
27
6
1

| Payment Code Track 1 | | | | | | | | |
|---|---|---|---|---|---|---|---|---|
| 1 | 2 3 … … 8 9 … 14 16 17 18 19 20 | 21 | 22 23 … 32 33 | 34 | 35 36 37 38 | 39 40 41 | 42 43 … 49 50 51 … 73 74 75 76 | Positions |
| 1 | 1 2 … 6 7 8 … 14 15 16 17 18 19 | 1 | 1 2 … 11 12 | 1 | 1 2 3 4 | 1 2 3 | 1 2 … 8 9 10 … 32 33 34 35 | |
| Format Code (FC) | Tokenized Primary Account Number (TPAN) | Field Separator (FS) | Customer Name | Field Separator (FS) | Expiration Date (ED) | Service Code (SC) | Payment Token (WFPT) | Field |
| B | Variable | ^ | Variable | ^ | Variable | 171 | Variable | Content |
| Indicates the card type | Numeric; generated by Mobile Wallet server | Delimiter | Customer Name. Format will LastName, FirstName (Ex. Robert Forrestor will be displayed as "Forre, Rober" | Delimiter | Format YYMM. where YYMM is a random number generated per the rule YY >15 & <=99 MM >=01 & <=12 | Default Value. | Alphanumeric; generated by Mobile Wallet server | Description |
| Char | Numeric | Char | String | Char | Numeric | Numeric | String | Type |
| | | | | | | | | |

FIG. 5

| Payment Code Track 2 | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | Positions |
| 1 | 1 | 2 | 3 | 4 | 5 | 6 | 7 | 8 | 9 | 10 | 11 | 12 | 13 | 14 | 15 | 16 | 17 | 18 | 19 | 1 | 1 | 2 | 3 | 4 | 1 | 2 | 3 | 1 | 2 | 3 | 4 | 5 | 6 | 7 | 8 | 9 | 10 | |
| Format Code (FC) | Tokenized Primary Account Number (TPAN) | | | | | | | | | | | | | | | | | | | Field Separator (FS) | Expiration Date (ED) | | | | Service Code (SC) | | | Payment Token (WFPT) Subset that includes the prefix. | | | | | | | | | | Field |
| ; | Variable | | | | | | | | | | | | | | | | | | | = | Variable | | | | 171 | | | Variable | | | | | | | | | | Content |
| Indicates the card type | All Numeric values; generated by Mobile Wallet server | | | | | | | | | | | | | | | | | | | Delimiter | Format YYMM. where YYMM is a random number generated per the rule YY >15 & <=99 MM >=01 & <=12 | | | | Default Value. | | | All Numeric values; generated by Mobile Wallet server | | | | | | | | | | Description |
| Hex B | Numeric | | | | | | | | | | | | | | | | | | | Hex D | Numeric | | | | Numeric | | | Numeric | | | | | | | | | | Type |

FIG. 6

Wallet Representation of Primary Account Number

| Tokenized PAN | | | | | | | | | | | | | | | | | | | |
|---|---|---|---|---|---|---|---|---|---|---|---|---|---|---|---|---|---|---|---|
| Positions | 1 | 2 | 3 | 4 | 5 | 6 | 7 | 8 | 9 | 10 | 11 | 12 | 13 | 14 | 15 | 16 | 17 | 18 | 19 |
| Field | IIN | | | | | | Trace ID | | | | | | | | Pseduo Check Digit | Last4 | | | |
| Description | Unique IIN | | | | | | Unique random numeric value. Will be used to validate transaction | | | | | | | | Luhn factor to calculate Check digit | Last 4 digits of Default Payment Type - Last digitis Check digit | | | |
| Type | Numeric | | | | | | Numeric | | | | | | | | | Numeric | | | |
| | | | | | | | | | | | | | | | | | | | |

FIG. 7

Track 2 of Actual Card Number with Trace ID embedded

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | Positions |
|---|---|---|---|---|---|---|---|---|---|---|---|---|---|---|---|---|---|---|---|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 1 | 1 | 2 | 3 | 4 | 1 | 2 | 3 | 1 | 2 | 3 | 4 | 5 | 6 | 7 | 8 | 1 | 1 | 2 | 3 | 4 | |
| Format Code (FC) | Card Number (PAN) (Debit or Credit) | | | | | | | | | | | | | | | | Field Separator (FS) | Expiration Date (ED) | | | | Service Code (SC) | | | Trace Id | | | | | | | | Offline QR Flag | | | | | Field |
| ; | Variable | | | | | | | | | | | | | | | | = | Variable | | | | 520 | | | Variable | | | | | | | | 1 | | | | | Content |
| Indicates the card type | Customer's Payment Type configured in Mobile Wallet | | | | | | | | | | | | | | | | Delimiter | Format YYMM Card Expiration Date | | | | Default Value. | | | Trace Id from the TPAN | | | | | | | | O if online, 1 if offline | | | | | Description |
| Hex B | Numeric | | | | | | | | | | | | | | | | Hex D | Numeric | | | | Numeric | | | Numeric | | | | | | | | Numeric | | | | | Type |

FIG. 8

MOBILE WALLET ACCOUNT BALANCE SYSTEMS AND METHODS

CROSS-REFERENCE TO RELATED APPLICATIONS

This application is a continuation application of U.S. application Ser. No. 17/893,098, filed Aug. 22, 2024, titled "Mobile Wallet Account Balance Systems and Methods," which is a continuation application of U.S. application Ser. No. 16/224,462, filed Dec. 18, 2018, titled "Mobile Wallet Account Balance Systems and Methods," which is a continuation application of U.S. application Ser. No. 14/553,756, filed Nov. 25, 2014, titled "Mobile Wallet Account Balance Systems and Methods," which is a continuation-in-part application of U.S. application Ser. No. 14/501,880, filed Sep. 30, 2014, titled "Mobile Wallet Account Provisioning Systems and Methods," which is a continuation-in-part of U.S. application Ser. No. 14/266,580, filed Apr. 30, 2014, titled "Mobile Wallet Using Tokenized Card Systems and Methods," all of which are incorporated herein by reference in their entireties.

BACKGROUND

The present disclosure relates generally to the field of systems that use mobile devices to transfer funds. More specifically, the present disclosure relates to systems and methods for enabling individuals to use their electronic devices to transfer funds, purchase products and services.

Payments for products and services are often completed using credit cards, debit cards, checks, or cash. At the same time, most people carry some type of mobile handheld electronic device, such as a cellular phone, smart phone, mobile handheld wireless e-mail device, personal digital assistant, portable gaming devices, and so on. Most of these devices tend to have a wireless Internet connection. A person may wish to make payments to merchants or other individuals using these mobile devices. Likewise, a person may wish to transfer funds to other individuals using their mobile devices. Enhanced systems and methods of facilitating such transactions would be desirable.

SUMMARY

According to one example embodiment, a computer system accesses a database to retrieve account balance information for an account held by a user at a financial institution. The computer system generates a screen display to present to the user via a mobile device. The screen display shows the account balance information. The computer system receives, via the mobile device, an indication from the user that the user wishes to perform a mobile wallet transaction to transfer funds to a recipient. The computer system transmits the funds to the recipient responsive to receiving the indication.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 5 illustrates a Track 1 format for a generated QR code that may be created in the token generation process, according to an example embodiment.

FIG. 6 illustrates a Track 2 format for a generated QR code that may be created in the token generation process, according to an example embodiment.

FIG. 7 illustrates a tokenized primary account number (TPAN) format within the QR code of FIGS. 5-6, according to an example embodiment.

FIG. 8 illustrates a Track 2 format for a code generated, according to an example embodiment.

DETAILED DESCRIPTION

Figure 1:
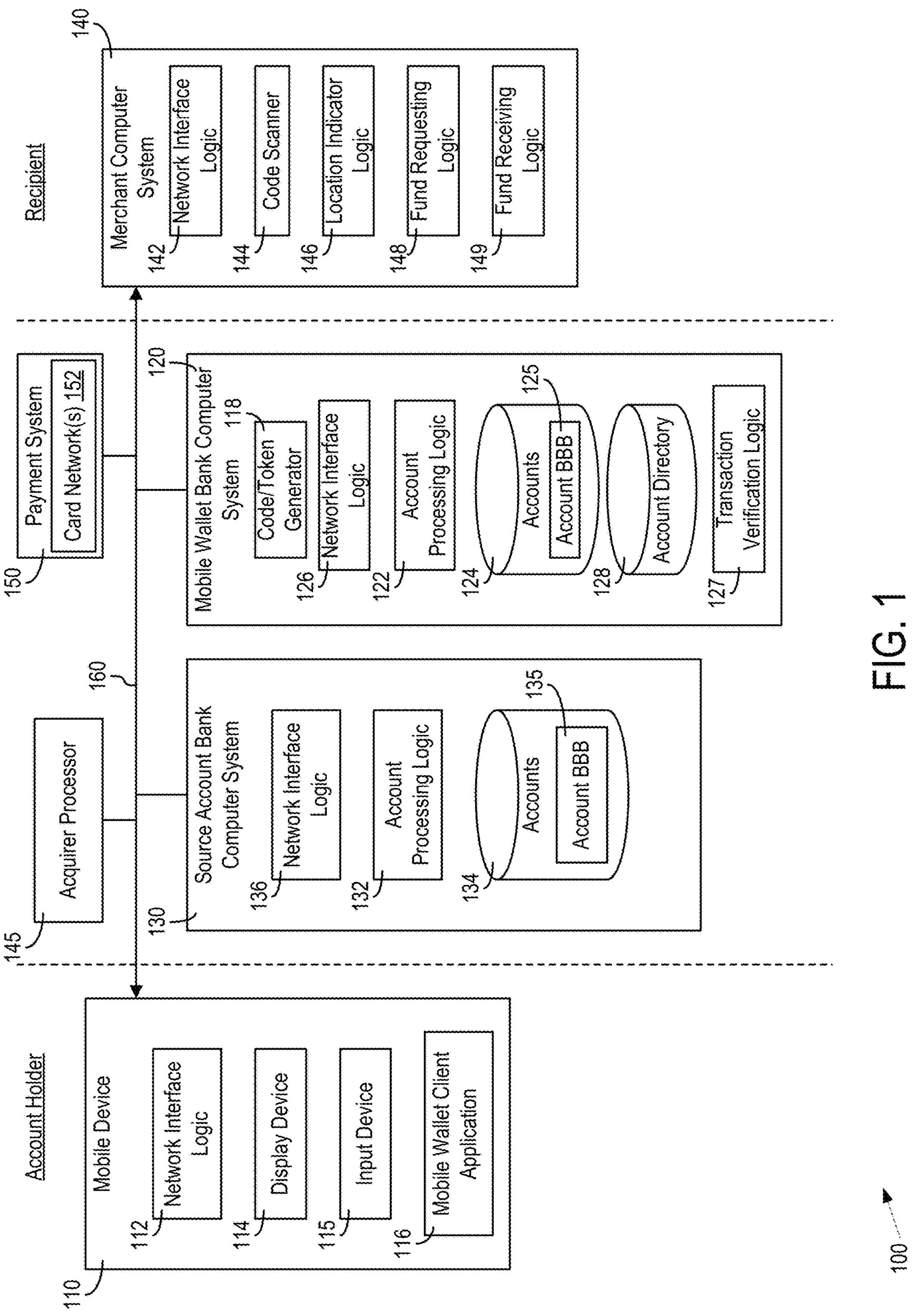
FIG. 1 is a block diagram of a computer-implemented payment processing system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing token generation and validation features for a payment processing system are described. More particularly, the present disclosure relates to the use of codes with tokens for validation during payment processing. The codes may be transmitted, e.g., using optical image methods (e.g., QR code), NFC, wireless, Bluetooth, low energy Bluetooth, RFID, hypersonic, Wi-Fi, cellular 3G, 4G, GSM, LiFi, etc. The systems and methods described herein may be implemented for users having a mobile wallet implemented on a mobile device. The mobile wallet allows the user access to accounts via the mobile device to provide payments to merchants or other users. The systems and methods described herein allow for integration between a mobile wallet server and a merchant for processing a payment.

In an embodiment of the present disclosure, a code representing a substitute card number may be generated and formatted for use as part of a validation system. When a user registers for a mobile wallet account, a customer token may be generated for the user and a device token may be generated for the device used by the user. The customer token and device token may be used to verify further transactions between the user and the mobile banking system or mobile wallet account.

When the user logs into his or her mobile wallet and wishes to make a payment using funds in the user's accounts, the customer token and device token are sent or provided to a server system. A substitute card number (tokenized) including a trace ID number as described below may be provided to the user by a mobile wallet computer system. The mobile wallet computer system and a point of sale (POS) device, e.g., at the store location at which the payment is to be submitted, use the substitute credit card number to authenticate the transaction. The substitute card number may be formatted to include a portion of an actual card number held by the user, e.g., so that the last four digits appearing on a receipt provided to the user match those of the user's actual card number, even though a substitute card number was provided to the merchant to process the payment.

In various embodiments, the substitute card number (tokenized) including a trace ID number as described below may be converted back into the actual credit card number by a mobile wallet computer system. For example, the merchant point of sale device may provide the substitute card number to the mobile wallet computer system. In response, and after authenticating the transaction, the mobile wallet computer system may return the actual card number to the merchant computer system. The merchant computer system may then provide the actual card number to an acquirer processor computer system, which in turn may provide the actual card number a payment network, which in turn may provide the card number to a source account (credit card issuer) computer system for payment processing. Such embodiments facilitate processing of rewards points and other rewards information at the point of sale.

In other embodiments, the merchant point of sale device may provide the substitute card number to an acquirer processor computer system, which in turn may provide the substitute card number to the mobile wallet computer system. In response, and after authenticating the transaction, the mobile wallet computer system may return the actual card number to the acquirer processor computer system. The acquirer processor may then provide the actual card number to a payment network, which in turn may provide the card number to a source account (credit card issuer) computer system for payment processing.

In other embodiments, rather than providing the substitute card number to the mobile wallet computer system, the acquirer processor computer system may provide the substitute card number to a payment network computer system. In turn, the payment network computer system may provide the substitute card number to the mobile wallet computer system, which, after authenticating the transaction, may then return the actual card number to the payment network computer system. The payment network computer system may then provide the actual card number to a source account computer system for payment processing.

Referring to FIG. 1, a computer-implemented payment processing system 100 is shown, according to an example embodiment. The payment processing system 100 may be used to set up and utilize a mobile wallet. The user may be a business entity and/or an individual consumer that has one or more source accounts with a financial institution. The source accounts may include business or consumer demand deposit, credit card, debit card accounts, lines of credit, and so on. The mobile wallet account may be created for the user to transmit funds from a source account to pay for goods or services to a merchant. Additionally, funds can be transferred from the source account to another person.

The payment processing system 100 may include, among other systems, a mobile device 110, a mobile wallet bank computer system 120, a source account bank computer system 130, a merchant computer system 140, an acquirer/processor computer system 145 and a payment system 150. The various systems may communicate through a network 160, which may include one or more of the Internet, cellular network, Wi-Fi, Wi-Max, a proprietary banking network, or any other type of wired or wireless network. In some embodiments, the mobile wallet bank computer system 120 and source account bank computer system 130 may be owned by the same entity. In other embodiments, the mobile wallet bank computer system 120 and source account bank computer system 130 may be owned by a different entity.

The mobile wallet bank computer system 120, the source account bank computer system 130, the acquirer/processor computer system 145 and the payment system 150 may each include a computer system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, non-transitory computer storage media. The memory may include data base components, object code components, script components, or any other type of information structure for supporting the various activities and information structures described herein. The memory may be communicably connected to the processor and include computer code or instructions for executing one or more processes described herein.

The mobile wallet account may be established in a variety of ways, for example, through an online banking area of a website of the banking institution that operates the mobile wallet bank computer system 120.

The mobile device 110 may be used by an individual user (e.g., a business owner or employee, a consumer, etc.) to create and interact with a mobile wallet account. The mobile device 110 may, for example be, a cellular phone, smart phone, mobile handheld wireless e-mail device, personal digital assistant, portable gaming device, or other suitable device. The mobile device 110 includes a network interface logic 112, a display device 114, an input device 115, and a mobile wallet client application 116. The network interface logic 112 may include, for example, program logic that connects the mobile device 110 to the network 160. For example, the mobile device 110 may receive and display screens including account information, transaction instructions, and so on. In one embodiment, a screen may be used to request a username and password information from the user, to prompt the user to provide information regarding the amount of a payment and which merchant or individual (e.g., name, address, phone number or e-mail, a selection of a recipient by the user from his/her memory or from the mobile device 110, etc.) is to receive the payment. Such screens are presented to the user via the display device 114. The input device 115 may be used to permit the user to initiate account access and to facilitate receiving requested information from the user. The input device 115 may include, for example, a keypad or keyboard, a touchscreen, a microphone, or any other device that allows the user to access the payment processing system 100. As will be appreciated, in addition to or instead of the mobile device 110, users may also be provided with the ability to access the payment processing system 100 using another type of computer (e.g., a desktop or laptop computer executing browser software) to perform the operations described herein as being performed by the mobile device 110.

The mobile wallet client application 116 or mobile wallet circuit may include program logic executable by mobile device 110 to implement at least some of the functions described herein. In order to make the mobile wallet circuit 116, the mobile wallet bank computer system 120 may provide a software application and make the software application available to be placed on the mobile device 110. For example, the mobile wallet bank computer system 120 may make the software application available to be downloaded (e.g., via the online banking website of the mobile wallet bank, via an app store, or in another manner). Responsive to a user selection of an appropriate link, the mobile wallet application may be transmitted to the mobile device and may cause itself to be installed on the mobile device 110. Installation of the software application creates the mobile wallet circuit on the mobile device 110. Specifically, after installation, the thus-modified mobile device 110 includes the mobile wallet circuit (embodied as a processor and instructions stored in non-transitory memory that are executed by the processor).

As will be appreciated, the level of functionality that resides on the mobile device 110 as opposed to the mobile wallet bank computer system 120 may vary depending on the implementation. The client application 116 may provide an interface that is configured to receive and display mobile web pages received from the mobile wallet bank computer system 120 (e.g., web pages prompting the user to provide information to create an account, web pages displaying account balance information and past transactions, and so on). Upon initiation of a transaction, the client application 116 may request data from the mobile wallet computer system 120 to generate a unique code/token. The unique code/token may then be transmitted by the mobile device 110 to the merchant computer system 140 as part of a transaction to facilitate authentication of the transaction. In other embodiments, the mobile wallet bank computer system 120 may implement the code/token generator.

The mobile wallet client application 116 is used in connection with merchant computer system 140 located at a brick and mortar store location. Additionally, the mobile wallet application 116 may also be used in connection with online merchant transactions. In another embodiment, merchants may be provided with the ability to have a mobile storefront and profile within the mobile wallet client application 116. For example, merchants may be provided with the ability to display marketing material, provide information, and promote products or discounts. Merchants may also be provided with the ability to sell items directly through their mobile storefront for the account holder to purchase from within the mobile wallet client application 116.

The mobile wallet client application 116 may offer a user to choose any one of the accounts for transferring funds to the merchant for goods or services. An account holder may select a default account that is used to make payments. The account holder may use account selection logic to select the account the account holder wants to use to pay the merchant or other recipient.

The mobile wallet bank computer system 120 includes code/token generator 118, account processing logic 122, an accounts database 124, network interface logic 126, transaction verification logic 127, and an account directory 128. In one embodiment, the mobile wallet bank computer system 120 is operated by a first banking entity that maintains and handles transaction processing for mobile wallet accounts. The mobile wallet accounts may be created via interaction of the mobile wallet application 116 with the mobile wallet bank computer system 120. The user may or may not have conventional bank accounts with the banking entity that maintains the mobile wallet bank computer system 120. If the user does not have bank accounts with the entity that maintains the mobile wallet bank computer system 120, then accounts associated with another banking entity may also be used. Again, in such an embodiment, the flow of funds into and out of the mobile wallet accounts may also be processed by the first banking entity using the mobile wallet bank computer system 120.

The mobile wallet bank computer system 120 is configured to store information regarding mobile wallet accounts. By way of example, information for a specific mobile wallet account 125 is shown as being stored in the accounts database 124. As will be appreciated, the accounts database 124 may also store information regarding many other mobile wallet accounts (not shown). As will also be appreciated, the extent to which transaction details are tracked and maintained in account processing logic 122 and stored in a storage database provided by the mobile wallet bank computer system 120 may vary in differing embodiments. The account database 124 may store details regarding credit card accounts. In particular, the account database 124 may store each financial transaction that occurred. Each financial transaction may include the amount of the transaction and the merchant.

The code generator 118 may receive a request from an account holder to initiate a transaction. In response, the code generator 118 may generate a code that may be transmitted by the mobile device 110 to the merchant computer system 140. As will be appreciated, any suitable method may be used to transmit the code. In various embodiments, the code may be transmitted using optical image methods (e.g., QR code), NFC, wireless, Bluetooth, low energy Bluetooth, RFID, hypersonic, Wi-Fi, cellular 3G, 4G, GSM, LiFi, etc. For purposes of providing an example, it is sometimes assumed in the discussion of FIGS. 1-11 that an optical method is used (e.g., QR code). In various embodiments, the code may be generated without the account holder providing the merchant's name or amount of transaction. The code generator 118 can be configured to generate a code that incorporates at least one of a date, time, trace ID, unique transaction identifier, and geographic location of the mobile device. In other embodiments, the code generator 118 may generate a tokenized numerical code that is in the Track 1 and Track 2 formats as specified by the ISO 8583 specification.

The code may incorporate at least a portion of an account number for a source account that is associated with the mobile wallet account. The incorporated user account number indicates the payment method to be associated with the transaction (e.g., which of the user's credit cards will be used for the transaction). The code may be generated such that a combination of random digits and a portion of a payment card number are included in the code, e.g., so that the last four digits appearing on a receipt provided to the user match those of the user's actual card number, even though a substitute card number was provided to the merchant. The various fields of such a code, and the format of such a code, are described in greater detail in FIGS. 5-8.

The mobile wallet account 125 holds funds that are transmitted to a recipient 140 upon receiving instructions from the user through the mobile device 110. As described below, funds flow into and out of the mobile wallet account 125 through the payment system 150. The mobile wallet account logic 120 is connected to the payment system 150 through the network 160. The network interface logic 126 may include, for example, program logic that connects the mobile wallet bank computer system 120 to the network 160.

The mobile wallet bank computer system 120 further includes transaction verification logic 127. The transaction verification logic 127 may receive a transaction amount from the merchant computer system 140. In some embodiments, the transaction verification logic 127 may generate a message to send to the mobile device 110 for verifying the transaction amount. Upon receiving the verification message, the account holder via the mobile device 110 may approve or deny the transaction amount for the mobile wallet bank computer system 120.

The source account computer system 130 includes account processing logic 132, an accounts database 134, and network interface logic 136. In an example embodiment, as previously indicated, during registration process for the mobile wallet account 125, the user may be prompted to identify a source account 135, that is, a source of funds for the mobile wallet account. The source account 135 may be an existing demand deposit account or a credit card account held by the user with the same financial institution or another financial institution. When the mobile wallet account 125 is created, the user is prompted to provide bank account information (e.g., routing number and/or account number) for the source account 135 that is used as a source of funds for the mobile wallet account 125. Thus, the financial institution that provides the mobile wallet account 125 for the user and the financial institution that typically provides banking services to the user may be two different financial institutions. In such situations, a second banking entity that maintains and handles transaction processing for source accounts may operate the source account computer system 130. In other situations, the computer systems 120 and 130 may be considered as being integrated in a single payment processing system (e.g., if the two financial institutions are the same). As will be appreciated, in a situation where the mobile wallet computing system 120 has many users, some users may have all their mobile wallet source accounts at the same bank that operates the mobile wallet computer system 120, some users may have all their mobile wallet source accounts at a bank other than the same bank that operates the mobile wallet computer system 120, and some users may have some of their mobile wallet source accounts at the same bank that operates the mobile wallet computer system 120 and other of their mobile wallet source accounts at a bank other than the bank that operates the mobile wallet computer system 120.

The merchant computer system 140 may be used at a point of sale location to conduct transactions with the account holder. For example, the merchant computer system 140 may include a point of sale computer system such as a cash register system connected to a central server system operated by the merchant. As another example, the merchant computer system 140 may include a mobile computing device (e.g., smart phone, tablet PC, etc.) operated by a store clerk as the clerk moves throughout the store. Again, the mobile computing device in such an embodiment may connect to a central server system operated by the merchant.

The merchant computer system 140 includes network interface logic 142, a code scanner 144, location indicator logic 146, fund requesting logic 148, and fund receiving logic 149. In one embodiment, the network interface logic 142 is configured to allow the merchant computer system 140 to communicate with the network 140. The network interface logic 142 sends and receives data from the mobile device 110 and the mobile wallet bank computer system 120.

The code scanner 144 may be configured to scan codes, such as but not limited to, optically scanned or non-optically scanned codes. In the embodiment of the present disclosure, the code scanner 204 scans one or more types of codes. After receiving the code, the scanner 144 determines the information that was incorporated into the code by the mobile device 110 or the mobile wallet bank computer system 120 that generated the code, as described below.

The location indicator logic 146 provides an indication of the geographic location of the code scanner 144. In one embodiment, the location indicator logic 146 may be programmed with the known address of the merchant location as the location of the code scanner, such that the location of the merchant can be compared with the location of the mobile device 110 as part of authenticating a transaction.

The fund requesting logic 148 communicates a fund request via the network interface logic 142 to the acquirer/processor computer system 145. In some embodiments, the fund requesting logic 148 may send the tokenized card number (that includes an issuer identification number (IIN), trace ID (generated numbers), checksum helper digit, last 4 digits of the actual card number) received from the user to the acquirer/processor computer system 145. In response to receiving a tokenized card number, the acquirer processor computer system 145 sends the tokenized card number to the mobile wallet bank computer system 120, which in turn sends the actual card number and a trace ID (embedded within the issuer discretionary field) to the acquirer processor computer system 145. The fund receiving logic 149 determines when payment has been received by the merchant computer system 140 and allocates the payment accordingly.

The merchant computer system 140 may further connect to or integrate with other hardware. For example, in one embodiment, the merchant computer system 140 may connect to a card reader for reading credit cards, debit cards, stored value cards, and so on. As another example, the merchant computer system 140 may be configured to prompt the user to provide a random security code. The random security code may be generated by the mobile device 110, by a separate security dongle, or in another manner. The security code may be provided to the merchant computer system 140 directly by the mobile device, may be keyed into the merchant computer system 140 (e.g., by a store clerk), or may be received in another manner.

The acquirer processor computer system 145 includes a computer system that transmits and receives messages from the mobile wallet bank computer system 120, the merchant computer system 140, or the payment system 150. In various embodiments, the acquirer processor computer system 145 may receive the tokenized card information and route the received information to the mobile wallet bank computer system 120. In other embodiments, the acquirer processor computer system 145 may receive the actual card information from the mobile wallet bank computer system 120 with the trace ID embedded within the issuer discretionary field in track 2 format. In some embodiments, the acquirer processor computer system 145 may transmit the actual card information with the trace ID to the payment system 150. In various embodiments, the acquirer processor computer system 145 may process the payment in the mobile wallet system described herein.

In other embodiments, and as previously noted, the acquirer processor computer system 145 may instead route the tokenized card information with the trace ID number to payment system 150. In turn, the payment system 150 may provide the substitute card number to the mobile wallet computer system 120, which, after authenticating the transaction, may then return the actual card number to the payment system 150. The payment system 150 may then provide the actual card number to a source account computer system 130 for payment processing.

The payment system 150 may comprise at least one card network 152. In some embodiments, the payment system comprises multiple card networks 152, such as Visa®, MasterCard®, American Express®, Discover®, Diners Club®, etc. In such an embodiment, the appropriate card network 152 may be determined based on the first digit of the actual account number (i.e., "4" corresponding to Visa®, "5" corresponding to Mastercard®, "6" corresponding to Discover®, and so on). The acquirer processor computer system 145 may therefore route the transaction to the appropriate card network 152 based on the first digit of the substitute credit card number. The card network 152 may then route the substitute card number to the mobile wallet computer system 145 based on the issuer identification number (IIN). For example, the card network 152 may identify the credit card number provided by the acquirer processor computer system 145 as being a substitute credit card number and not an actual credit card number based on the IIN. In one embodiment, this identification occurs based on the IIN being a card network-owned IIN that has been licensed to the mobile wallet bank and that has been designated by the mobile wallet bank and the card network for use in mobile wallet transactions. In such an arrangement, the acquirer processor computer system 145 processes the transaction like any other credit card transaction, and it is not necessary for the acquirer processor computer system 145 to be aware that the transaction is a mobile wallet transaction. Given the relatively limited number of card networks (e.g., Visa®, MasterCard®, American Express®, Discover®, Diners Club®, etc.), and given the much larger number of acquirer/processors, such an arrangement has the technical benefit of reducing modifications to existing computer systems to implement the features described herein. In other embodiments, this identification is made based on an indication from the merchant computer system 140 and/or the acquirer processor computer system 145 that the transaction is a mobile wallet transaction. Based on the IIN, the card network 152 may transmit the substitute card number to the mobile wallet computer system in turn receive the actual card number, expiration date, and authentication code (e.g., cvv, etc.) from the mobile wallet bank computer system 120.

The payment processing system 100 may further include additional bank computer systems that may allow the mobile wallet platform of the present disclosure to be accessed by consumers and merchants that bank at various different banking institutions. The additional bank computer systems may provide the services described herein through multiple banks, allowing for broader adoption of the mobile wallet platform.

Figure 2:
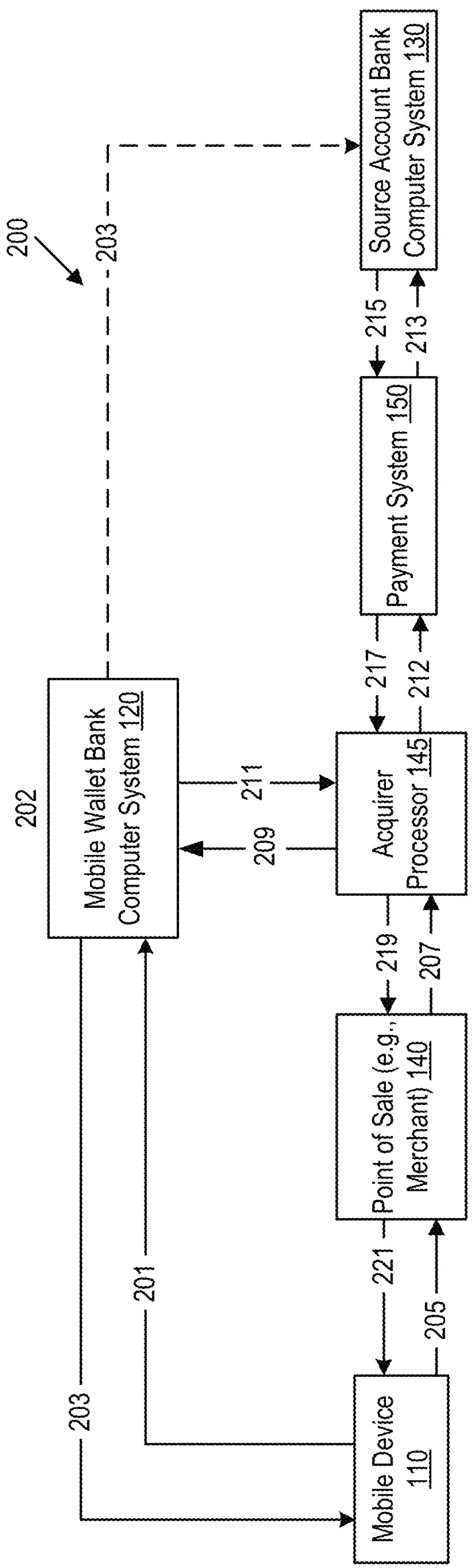
FIG. 2 illustrates a payment process that may be implemented by the system in FIG. 1 according to an example embodiment.

FIG. 2 illustrates a process 200 that may be implemented by the system in FIG. 1. When a user wishes to make a payment at a merchant, for example, the user may access the mobile wallet client application 116 by entering a PIN or other login credentials and then selecting a "pay now" or similar button. For example, the user may be located at a merchant location and may wish to pay for a good or service. As another example, the user may be located away from the merchant location or be engaged in an online transaction.

At step 201, the mobile device 110 requests access to funds in the mobile wallet via the mobile wallet bank computer system 120 to pay for a good or service. The mobile device 110 may provide a PIN, a customer ID, and a device ID to the mobile wallet bank computer system 120. The user may be identified and authenticated based on a match of these three data elements with information stored in the mobile wallet bank computer system 120. Further, the user's mobile wallet account information may be located/determined.

Next, at step 202, the mobile wallet bank computer system 120 may generate a tokenized credit card number as described in greater detail below. The tokenized credit card number may include a few generated numbers and a few numbers from the actual credit card number. In one embodiment, the tokenized credit number starts with an issuer identification number (IIN) that corresponds to the mobile wallet bank computer system 120, ends with the last four digits of the actual credit card account number of the credit card that is being used in the transaction, and further includes intervening digits including a trace ID and a checksum helper digit. The trace ID is described in further detail below and allows for enhanced authentication during the payment process. The may permit checksum verification of the tokenized credit card number. Various checksum algorithms may be used to verify that the tokenized credit card number is a valid credit card number.

The tokenized credit card number may be transmitted to the mobile device 110 in the form of a code. For example, the data may be encoded in accordance with the track 1 and/or track 2 formats used in the magnetic stripes of credit cards. In some embodiments, the code is formatted in Track 2 format. In either case, the primary account number field may contain the tokenized credit card number and the issuer discretionary field may contain the payment token. In yet other embodiments, another format is used.

At step 203, the tokenized credit card number is transmitted to the mobile device 110. If the mobile wallet bank computer system 120 and the source account computer system 130 are different computer systems (e.g., if the user is using a credit card that is provided by a different bank than the bank the operates the mobile wallet computer system 120), then the trace ID may also be sent to the source account computer system 130 at step 203.

At step 205, the mobile device 110 may display or otherwise transmit the tokenized credit card number to merchant computer system 140 (e.g., using a QR code, NFC, wireless, Bluetooth, low energy Bluetooth, RFID, hypersonic, Wi-Fi, cellular 3G, 4G, GSM, LiFi, or other method). At step 207, after receiving the tokenized card number, the merchant computer system 140 sends the transaction to an acquirer processor computer system 145 for processing.

Next, at step 209, the acquirer processor computer system 145 sends the tokenized card number to the mobile wallet bank computer system 120. After receiving the request from the acquirer processor computer system 145, the mobile wallet bank computer system 120 may determine the actual card number and send the actual card number back to the acquirer processor at step 211. In one embodiment, the determination of the actual card number may occur by searching for the account information associated with the payment token and/or trace ID within the tokenized card number. Additionally, the trace ID from the tokenized card number may be sent with the actual card number at step 211. At this point, the issuer discretionary field is no longer need for the payment token, hence, the trace ID may be sent to the acquirer processor computer system 145 in the issuer discretionary field.

At step 212, the acquirer processor computer system 145 sends the actual card number and the trace ID to the payment system 150 for processing a payment. The payment system 150 sends the actual card number with the trace ID and the transaction amount to the source account bank computer system 130 at step 213. The source account bank computer 130 may retrieve the trace ID that was received from the mobile wallet bank computer system 120 by searching for the actual card number that was received from the payment system 150. The source account bank computer 130 may compare the trace ID that was received/stored at step 203 with the trace ID that was received from the payment system 150 at step 213. Assuming there is a match, the source account bank computer 130 may issue an approval for the transaction. After verifying the actual card number and the trace ID in the issuer discretionary field, the source account bank computer system 130 may send an approval to the payment system 150 at step 215. The approval message may be sent from the payment system 150, to acquirer processor computer system 145, to the point of sale system 140, in steps 217 and 219. Upon receiving the approval message the point of sale system 140 may generate a receipt for the user. In some embodiments, the receipt may be sent to the mobile device 110 electronically. In other embodiments, the receipt may be printed physically at the point of sale location. The receipt may include the last four digits of the actual credit card account number of the credit card that was used in the transaction.

The use of the payment token and trace ID as described herein allows for two levels of authentication. The payment token is generated by the mobile wallet computer system at step 202. The payment token is then transmitted to the mobile device 110, then to the merchant computer system 140, then to the acquirer processor computer system 145, and eventually back to the mobile wallet computer system 120 where it is matched with the original payment token generated at step 202. Similarly, the Trace ID is also generated by the mobile wallet computer system at step 202, and then transmitted to the mobile device 110, then to the merchant computer system 140, then to the acquirer processor computer system 145, and eventually back to the mobile wallet computer system 120 where it is matched with the Trace ID generated at step 202. In the case of the Trace ID, however, the Trace ID is then further transmitted back to the acquirer processor computer system 145, then to the payment system 150, and then to the source account computer system 130 where it is matched with the Trace ID generated at step 202. Accordingly, the trace ID used in conjunction with the tokenized credit card number allows both the mobile wallet bank computer system 140 and the source account bank computer system 130 to authenticate the transaction. Using the trace ID in the above described manner may permit the source account bank computer system 130 and the mobile wallet bank computer system 120 to verify the trace ID at least twice prior to approving a transaction and transferring funds. Further, and as described in greater detail below, the trace ID may be used by the source account computer system 130 to determine whether the credit card transaction was a mobile wallet transaction (e.g., as opposed to an in-person card-present transaction involving use of the user's physical credit card, as opposed to an online transaction, and so on). Hence, the source account bank computer system 130 may provide a different customer experience to the mobile wallet user. The source account bank computer system 130 may also determine risk differently for transactions that use a mobile wallet.

In some embodiments, instead of embedding the trace ID in a tokenized credit card account number at step 202, the actual credit card number is transmitted to the mobile device 110 and the merchant computer system 140. In such an embodiment, the trace ID may be included in the issuer discretionary field at step 202, and the payment token may be communicated in another manner or another payment matching mechanism may be used. The trace ID may be stored in the issuer discretionary field and may travel though the payment processing system, until it is verified by the source account bank computer system 130. After being verified by the source account bank computer system 130, the transaction may be approved and the funds may be transferred from the source account bank computer system to the acquirer processor computer system 145. In other embodiments, the same financial institution may own the source account bank computer system 130 and the mobile wallet bank computer system 120.

Figure 3:
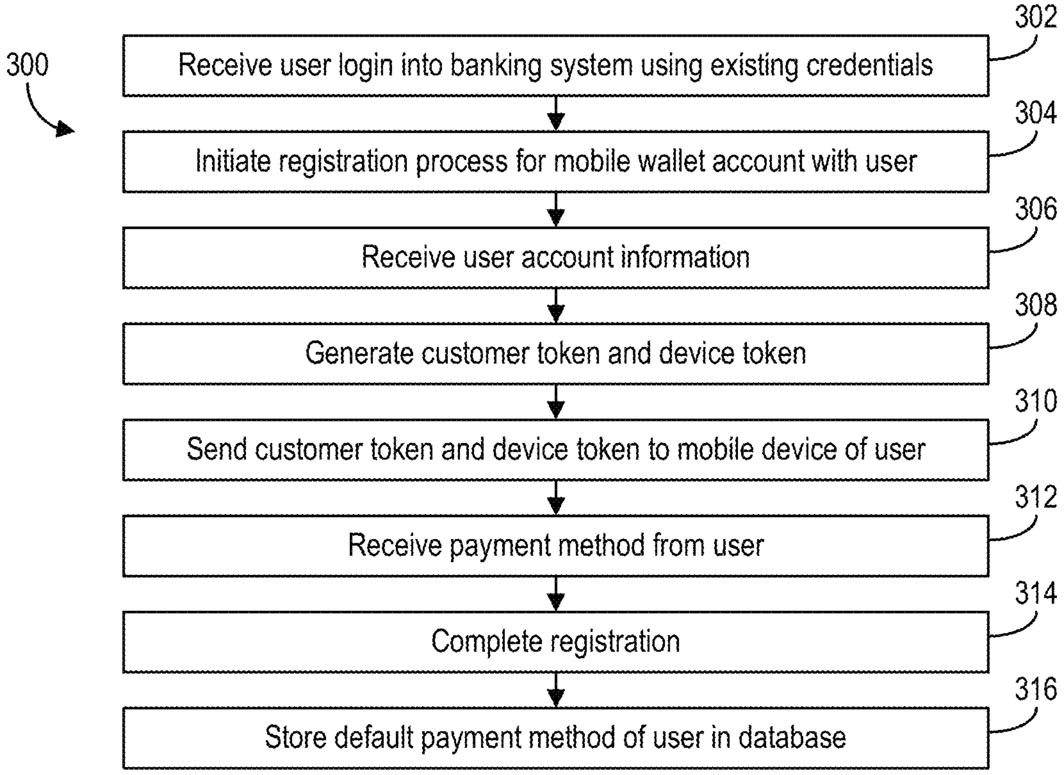
FIG. 3 illustrates a user registration process and a token generation process during registration, according to an example embodiment.

Referring now to FIG. 3 and FIGS. 3A-3F, FIG. 3 is a flow chart of a process 300 detailing a user registration process and a token generation process during registration, according to an example embodiment. FIGS. 3A-3F are screens that may be displayed to the user during the process 300 of FIG. 3 according to an example embodiment. Process 300 may be executed by a mobile device 110 and a mobile wallet bank computer system 120 that is configured to create and manage a mobile wallet account. Process 300 may be executed for a user who wishes to start a mobile wallet account 125 for a source account 135. In the example of FIG. 3, it is assumed that the user has an account at the bank that operates the mobile wallet computer system 140. As will be appreciated, a similar process may be used for users that have accounts only at other banks.

Figure 3A:
FIGS. 3A-3G illustrate display screens that may be displayed to the user during the process of FIG. 3.

As previously indicated in connection with FIG. 1, a user may perform the registration via an online banking website of the mobile wallet bank. For example, as shown in FIG. 3A, a user may select a button 301 for an online banking application on the mobile device 110.

Figure 3B:
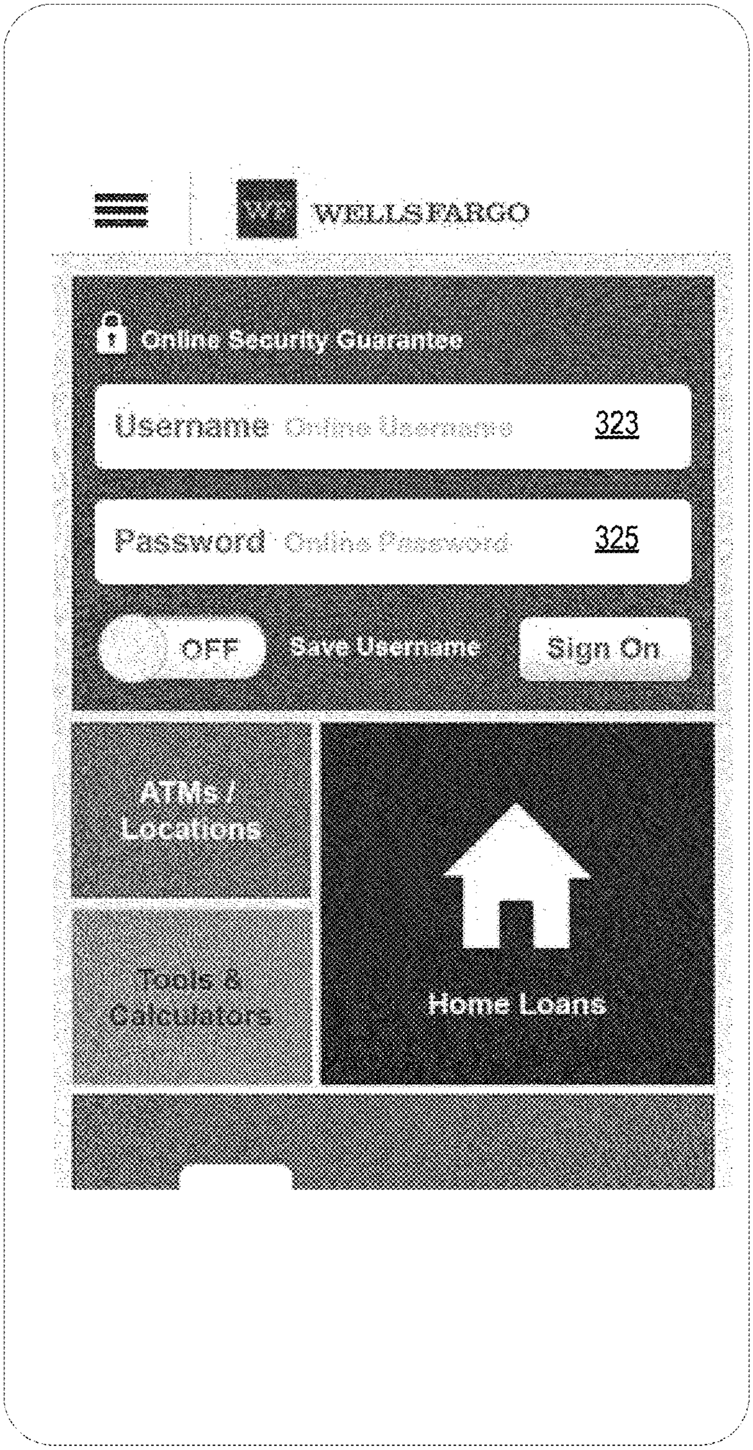
Figure 3C:
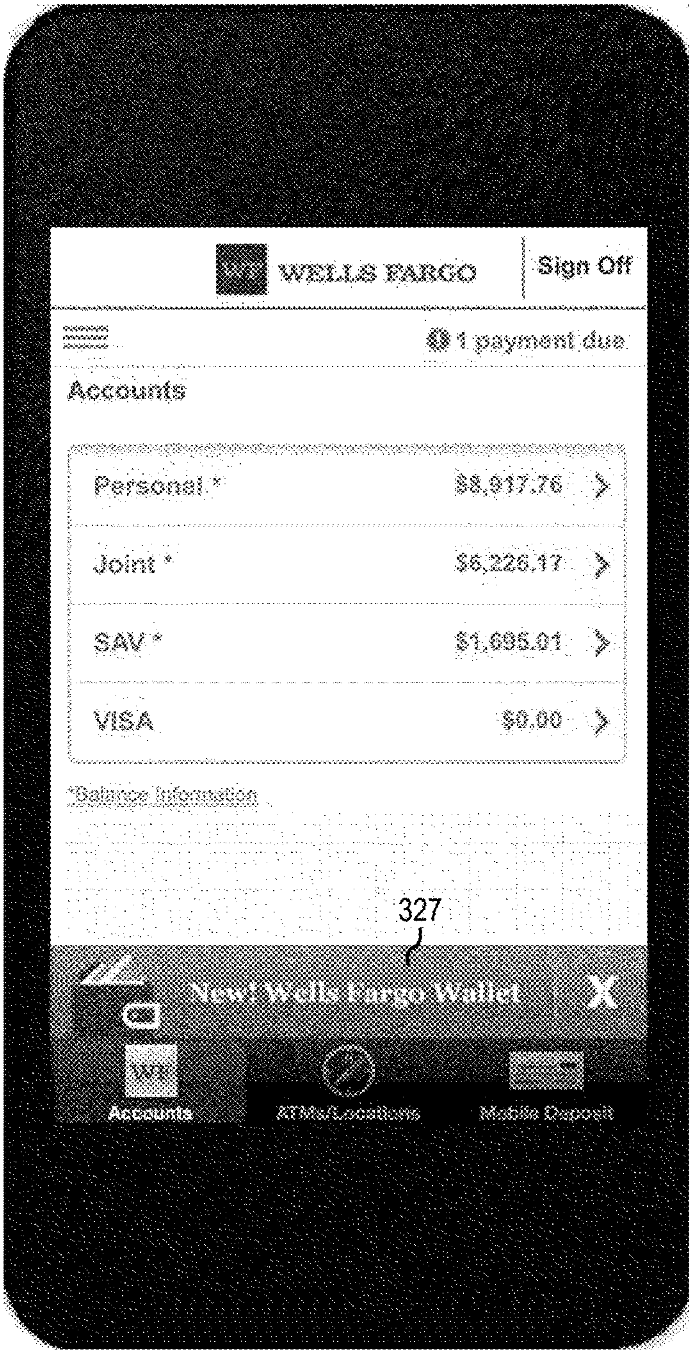

After the button 301 is selected, the user may be presented with a screen as shown in FIG. 3B. Process 300 includes receiving user authentication information into the mobile wallet bank computer system 120 using existing financial institution credentials (step 302). Existing credentials may include, for example, a username and password combination or card information (card number, account number, expiration date, CVV) for an online banking website of the bank that operates the mobile wallet computer system 120. For example, in FIG. 3B, the credentials are entered in fields 303 and 305, respectively, of a login screen to the online banking website. In one embodiment, the credentials may match keyboard-entered credentials that are used to access the source account via online banking. In other embodiments, the credentials may match other types of authentication credentials that are used to access online banking (e.g., facial recognition on a captured image or video of the user on a camera of the mobile device, voice or speech recognition captured by an input device of the mobile device, fingerprint authentication, etc.). After providing online banking login credentials as shown in FIG. 3B, the user may be taken to a top-level online banking screen as shown in FIG. 3C. The screen shown in FIG. 3C shows an overview of accounts and account balances held by the user.

Figure 3D:
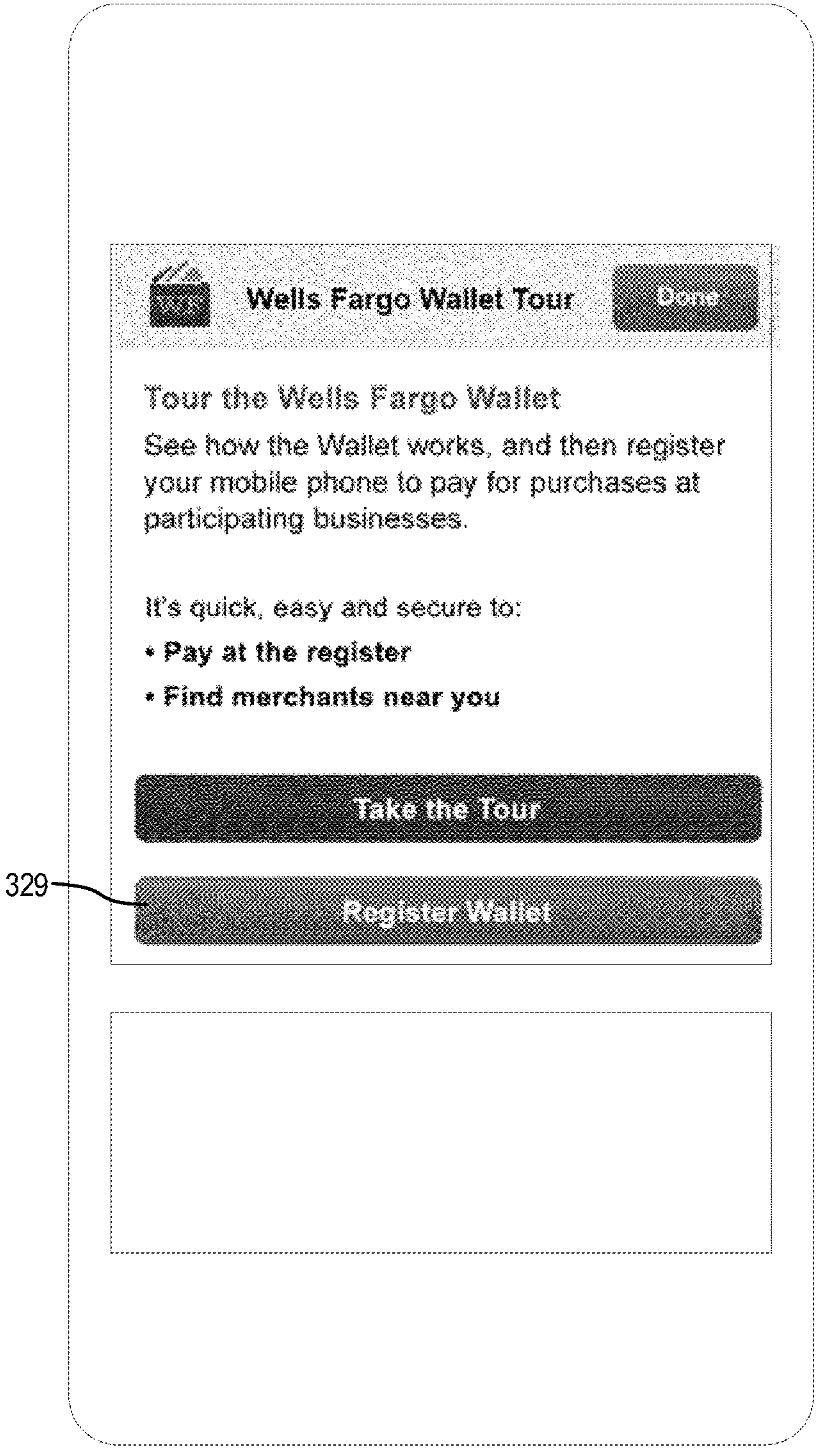
Figure 3E:
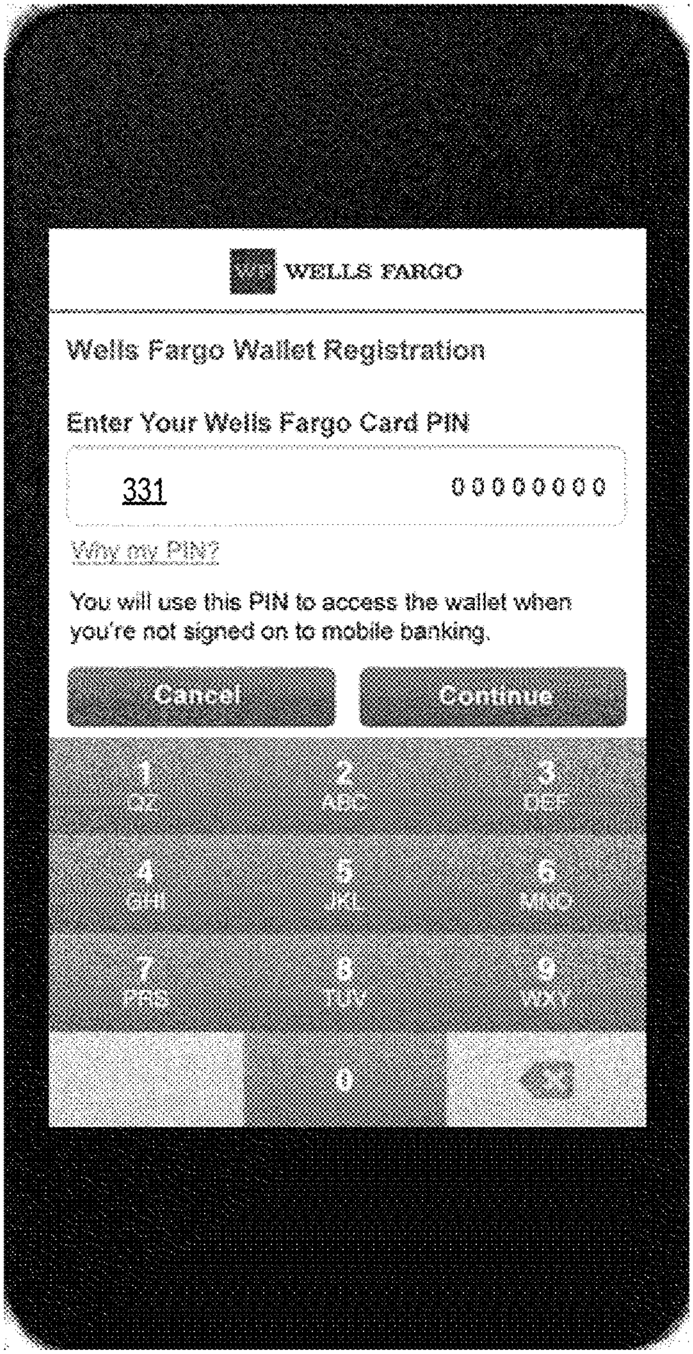

Process 300 further includes initiating a registration process for a mobile wallet account with the user (step 304). Step 304 includes receiving a user indication to create a new mobile wallet account. In some embodiments, the user may be presented with a menu option on his or her mobile device to create a new mobile wallet account, among other options. For example, in the top-level screen shown in FIG. 3C, a button 327 is provided that allows the user to receive additional information about the mobile wallet application. After selecting the button 327 in FIG. 3C, the user may be taken to a mobile wallet introductory screen as shown in FIG. 3D. In the screen shown in FIG. 3D, the user is provided with an option to tour the mobile wallet application and with an option to initiate the mobile wallet registration. Upon selecting button 329, the mobile wallet registration process is initiated. After selecting the button 329 in FIG. 3D, the user may be taken to a first screen for the mobile wallet registration as shown in FIG. 3E.

Figure 3F:
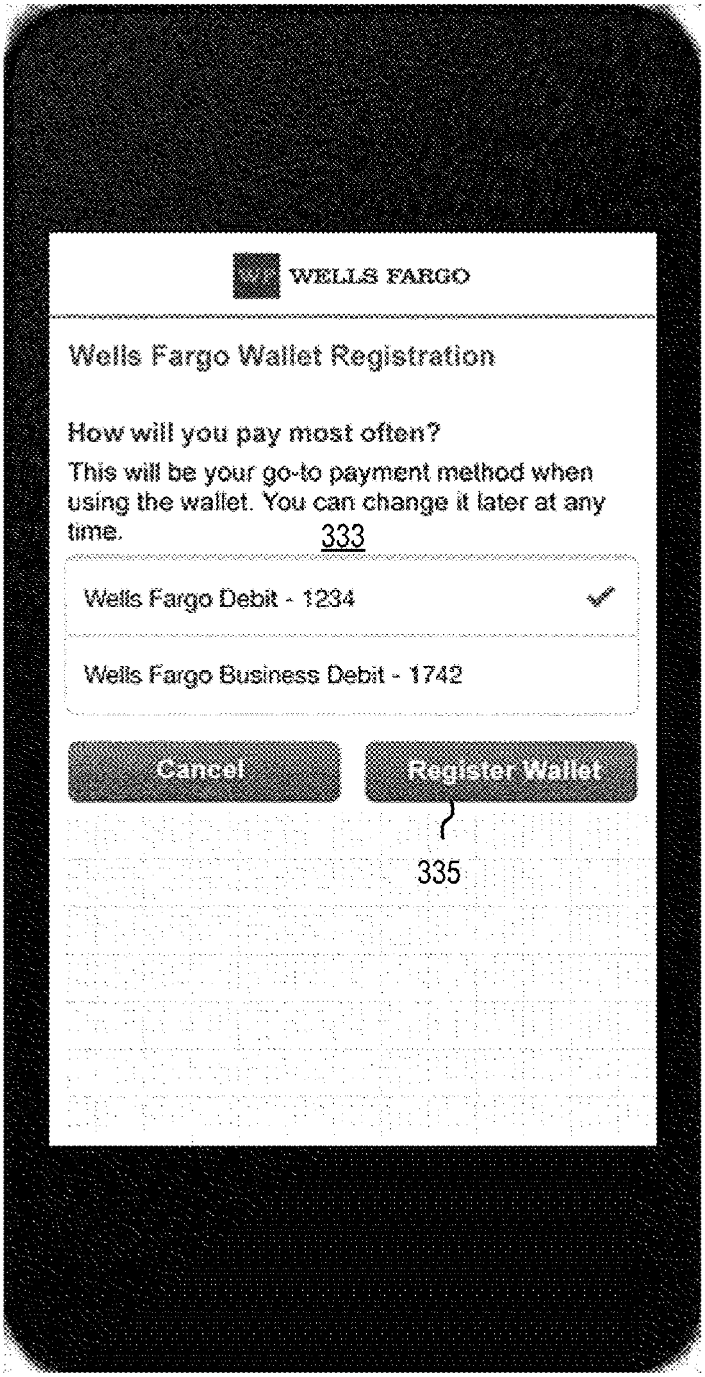

Process 300 further includes receiving user account information (step 306). Receiving the user account information may include prompting the user to provide mobile wallet login credentials, e.g., a PIN number associated with a debit card or credit card held by the user at the bank. For example, in FIG. 3E, the user enters a PIN number in field 331. The user may also be prompted to identify the source account(s) the user wishes to associate with the mobile wallet account. For example, the user may enter information about accounts held at other banks that may serve as source accounts. In other embodiments, the user may be presented with various fields on the mobile device that allow the user to select one or more source accounts held by the user, to enter account information (e.g., an account number) in one or more fields, or otherwise. For example, as shown in FIG. 3F, the user may be presented with a list 333 of accounts the user has with a particular source account bank computer system, and may choose one or more accounts to view account information and to select the account for use with the mobile wallet account. Thus, the mobile wallet may auto-provision the existing accounts of the user to the mobile wallet, without the user having to manually enter the 16-digit credit card account number or other account information (e.g., in the case of other types of financial accounts). The user may further provide information to create a user profile including other information as warranted. In some embodiments, the mobile wallet computer system 120 may establish a connection with the computer systems 130 of other financial institutions, such that the accounts held by the user at the other financial institutions may be auto-provisioned to the mobile wallet as well. In both cases, the user may be provided with information about current account balances regarding the accounts.

Process 300 further includes generating a customer token and device token (step 308), and sending the customer token and device token to the mobile device of the user (step 310). The customer token and device token may be tokens that identify the user and the associated mobile device to the mobile wallet bank computer system in the future. The tokens are encrypted by the mobile wallet bank computer system and provided to the mobile device. The mobile device stores the tokens for future use. In one example embodiment, each time the user accesses the mobile wallet system with a new mobile device 110, the mobile device is assigned its own device token. A device and customer token are stored on each device in order to bind the device to the user (one device can only have one wallet user, but one user can have multiple devices). Once a mobile device for mobile wallet account is registered, the user only needs to enter their existing PIN to access their mobile wallet from the registered device (which PIN may be typically eight characters or less and consist only of numbers). The full login credentials associated with online banking are not needed (which often consist of a combination of lower case letters, upper case letters, numbers, and special characters (e.g., punctuation marks)). Instead, possession by the user of the registered device provides an additional level of authentication that avoids the need for full login credentials. Additionally, it may be noted that the level of functionality available the user through the mobile wallet may be less than the level of functionality available to the user through the full online banking website, thereby providing further risk mitigation.

Process 300 further includes receiving a default payment method from the user (step 312) and completing the registration (step 314). Step 314 may include a user accepting terms and conditions associated with use of the mobile wallet account. The default payment method may indicate how a user wishes to normally pay for a particular transaction. For example, the user may provide options relating to how to manage overdrafts, whether the total payment should be provided in one or more payments, or otherwise. Process 300 may include storing the default payment method (step 316) in the profile database of the mobile wallet bank computer system 120 (or another database of the mobile wallet bank computer system). The default payment method may be recalled by the mobile wallet bank computer system 120 during a future payment process.

Figure 3G:
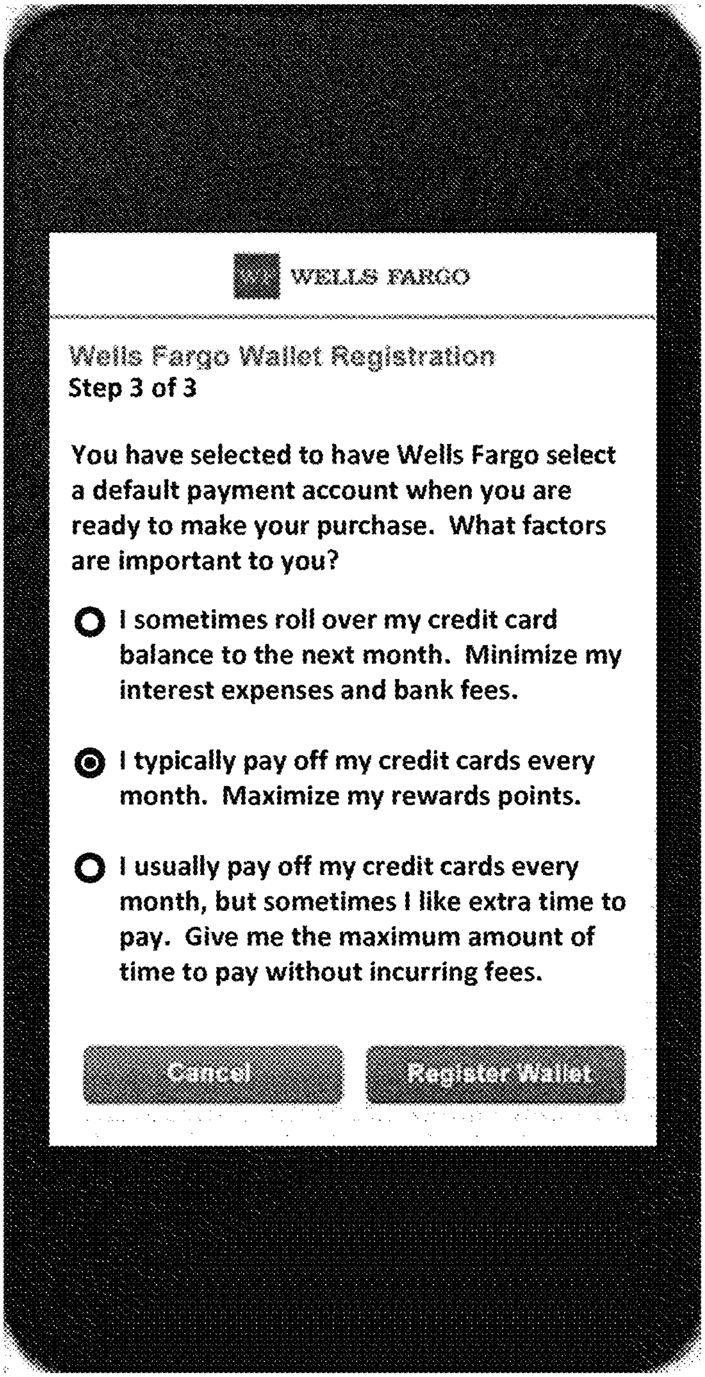

Referring now to FIG. 3G, in some embodiments, rather than receive a default payment method from the user at step 314, user preferences are received and the mobile wallet computer system 120 includes a payment method selection module that dynamically selects a default account at the point of sale based on the user preferences, current account balances, and/or other information. For example, as shown in FIG. 3G, the user may specify preferences such as "minimize my interest expenses and bank fees" or "maximize my rewards points." For example, for a user that typically pays off credit card balances every month, interest expenses may not be a concern, and such a user may wish to maximize rewards points. On the other hand, for a user that does not pay off credit card balances, interest expenses may be more of a concern. As another example, some users may wish to maximize the amount of time available to pay for a purchase. For example, if the user has two credit cards with different billing cycles, then which card is selected as the default payment method may vary depending on when payment would be due for the purchase for each of the two credit cards. Additional examples are given below in the context of FIGS. 4C-4D.

Process 300 may also include generating and sending an offline code token to the source account bank computer system. The offline code may be used by the payment processing system, and more particularly the source account bank computer system, to execute a payment for the user when the mobile device is offline, or for other account management purposes. In some embodiments, the mobile device may store one or more offline codes to provide to the merchant. The mobile device 110 may be able to conduct the transaction without contacting the mobile wallet bank computer system 120 and may provide the code to the merchant computer system 140.

As will be appreciated, the arrangement of FIG. 3 facilitates keeping a list of source accounts that is up to date and accurate to the user. For example, each time a transaction is to be performed, the mobile wallet computer system 120 may access a list of accounts held by the user at the mobile wallet bank. In some cases, an account that was previously active may no longer be active. For example, a user may have reported a physical credit card associated with a credit card account as having been lost or stolen. Prior to presenting a list of available source accounts to the user in the context of a particular transaction, the mobile wallet computer system 120 may determine that a previously-provisioned source account is no longer available as a source of funds. Hence, when the mobile wallet computer system 120 generates a screen display to present to the user via a mobile device showing the list of accounts held by the user at the financial institution, the previously-provisioned source account that is no longer available as a source of funds may be excluded from the list. When the list of available source accounts is presented to the user, the user may select a new source account for the transaction. For example, if the credit card account was the user's default payment method, the user may select a new default payment method (e.g., an existing demand deposit account).

Additionally, the arrangement may also permit new accounts to be activated and added to the mobile wallet, e.g., a new card account, a new savings account, a new line of credit, and so on. In the case of a new card account, the new card account may, for example, be a new credit card account, a new demand deposit account with a debit card, or an existing demand deposit account with a new debit card.

For example, in the case of a lost or stolen credit card, the bank may create a new credit card account in replacement of the credit card account for which the physical credit card was reported as having been lost or stolen. When the mobile wallet computer system 120 accesses the list of accounts held by the user, the mobile wallet computer system 120 may identify the new credit card account as being an account that has not yet been provisioned to the mobile wallet. When the screen display is generated showing the list of accounts held by the user, the list may then include the new credit card account, which may be selected by the user for provisioning to the mobile wallet. Again, the new credit card account may be provisioned to the mobile wallet without any manual entry by the user of account information regarding the new credit card account (other than the selection of the new credit card account by the user, indicating that the user wishes to add the new credit card account to the mobile wallet).

In the case of a new credit card account, the bank may issue a new credit card account immediately upon learning of the lost or stolen credit card associated with the previous credit card account. Typically, the bank may then mail the user a new physical/plastic credit card. Upon receiving the new physical credit card, the user may then activate the new credit card, e.g., by calling a credit card activation phone number printed on a sticker that has been placed on the card.

In some embodiments, the user may be provided with the option of activating the new credit card account through the mobile wallet. For example, the bank may perform a first activation of the new credit card account for purposes of transactions implemented via a mobile wallet. Such an activation may be performed via the mobile wallet itself (i.e., the user does not need to take any action outside of the mobile wallet to have the new credit card account activated). For example, the user may be prompted with a message indicating that the credit card account has not yet been activated, and querying whether the user wishes to do so now (e.g., "Click 'Yes' to activate your new credit card for your mobile wallet"). For security purposes, the first activation does not activate the credit card for non-mobile wallet transactions involving use of the plastic credit card. Rather, the bank may also perform a second activation of the new credit card account for purposes of transactions implemented via a physical credit card associated with the new credit card account. Hence, the plastic credit card is not useable for credit card transactions until the second activation occurs. Such an arrangement ensures that the user is in possession of the physical credit card before the physical credit card is activated for purposes of transactions implemented via the physical credit card (e.g., a card-present transaction at a bricks and mortar merchant).

As will be appreciated, it may often take several days or more for a new physical credit card to be produced and delivered to the user after the user reports a previous credit card as having been lost or stolen. In the arrangement described herein, the credit card account may be activated for mobile wallet transactions much earlier, before the credit card is activated for the non-mobile wallet transactions involving use of the plastic credit card. For example, the credit card account may be activated one or more days before the user receives the plastic credit card, or even within one day of the bank receiving the report from the user that the plastic credit card has been lost or stolen. In some embodiments, the new credit card account may be activated for the mobile wallet within one hour or less of receiving the report from the user that the plastic credit card has been lost or stolen.

In other embodiments, when a credit card is reported as lost or stolen, the mobile wallet computer system 120 may permit the user to continue using the credit card number associated with the plastic credit card for mobile wallet transactions, but prevent the plastic credit card from being used for card-based transactions. When a physical credit card is lost or stolen, the physical credit card has been compromised. However, for purposes of the mobile wallet bank computer system 120, the account number is simply an account identifier. So long as the mobile wallet has not been compromised, the mobile wallet computer system 120 can ensure the integrity of the transaction based on the fact that the user is in possession of the mobile device 110, particularly in situations where at a point of sale a tokenized card number is used, anyway (e.g., as described above in connection with FIG. 2).

Referring now to FIG. 4 and FIGS. 4A-4D, FIG. 4 is a flow chart of a process 400 detailing a payment code generation process for an authenticated mobile wallet session, according to an example embodiment. FIGS. 4A-4D are screens that may be displayed to the user during the process 400 of FIG. 4 according to an example embodiment. Process 400 may be executed for a user requesting to execute a payment (e.g., transaction) with a merchant or other recipient 140. Process 400 may be executed by a mobile wallet bank computer system 120 configured to manage the user mobile wallet account.

Figure 4:
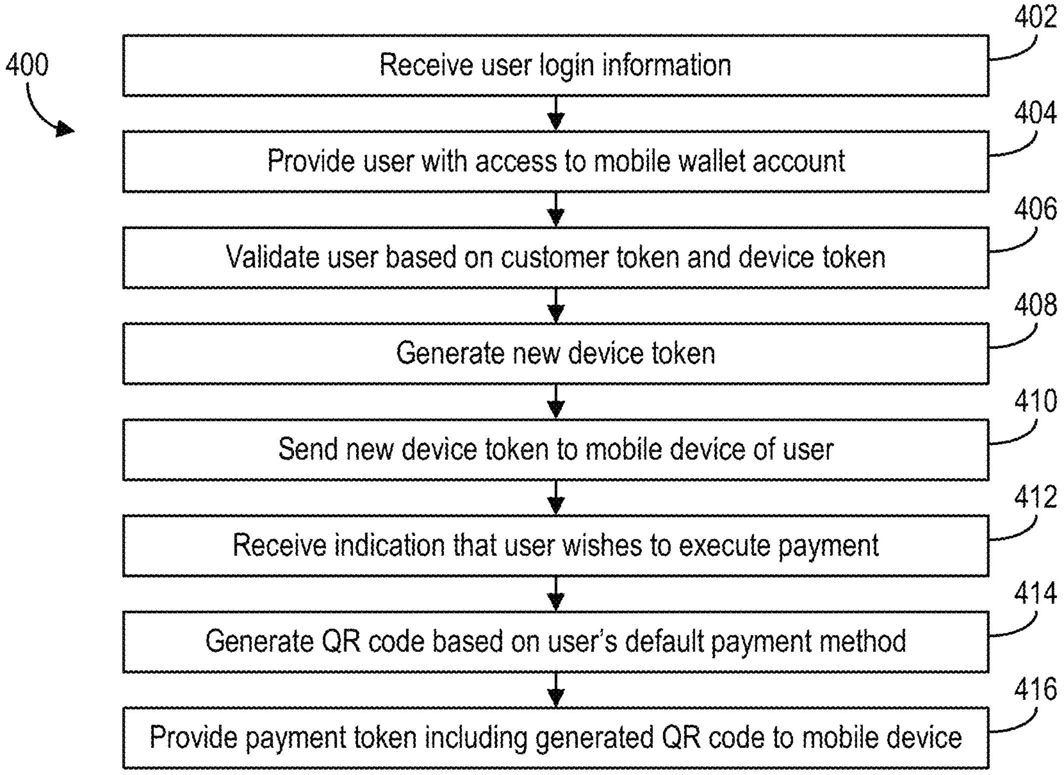
FIG. 4 illustrates a payment code generation process for an authenticated mobile wallet session, according to an example embodiment.
Figure 4A:
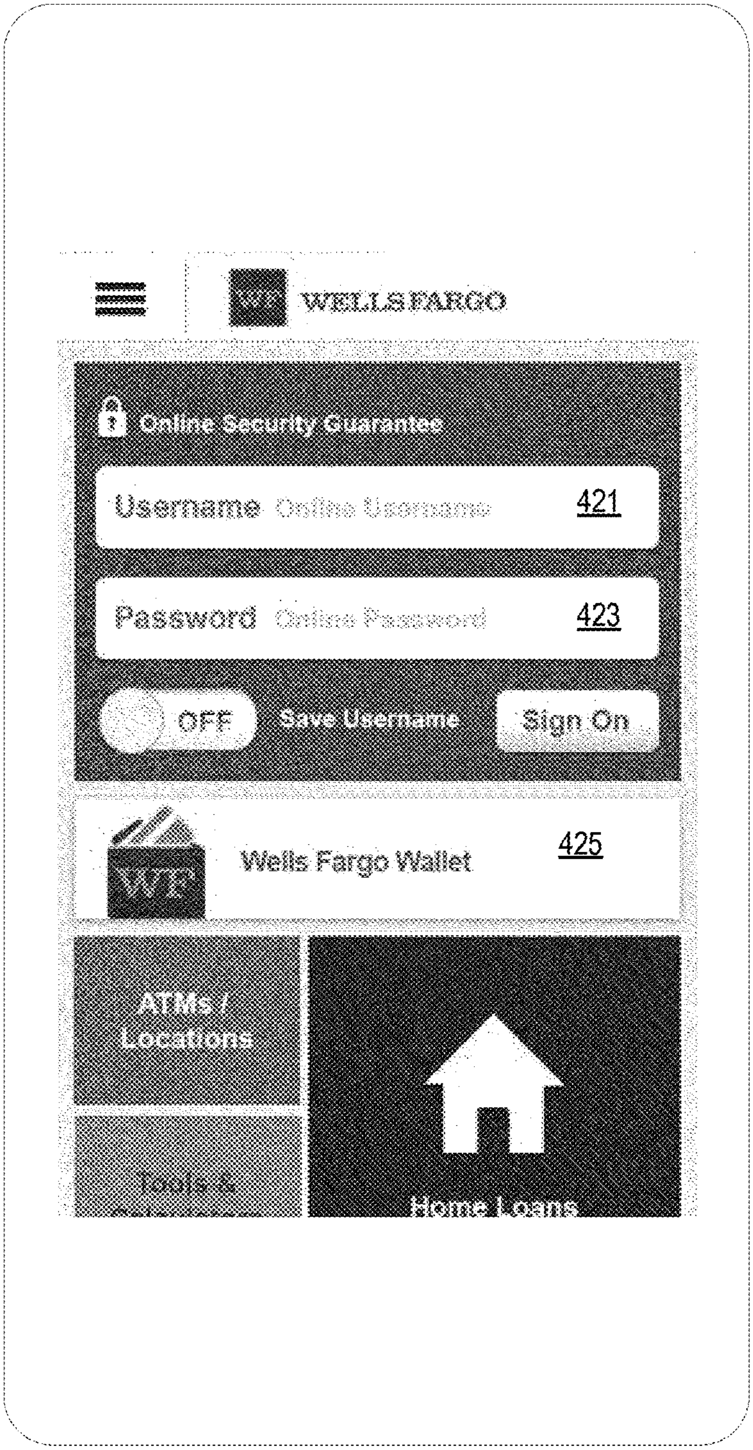
FIGS. 4A-4D illustrate display screens that may be displayed to the user during the process of FIG. 4.

FIG. 4A shows a mobile banking screen that may be displayed to the user after the mobile wallet application has been installed on the mobile device 110. Similar to FIG. 3B, the user is prompted in FIG. 4A to provide full online banking login credentials (fields 323 and 325). By providing such credentials in fields 323 and 325, the user may be provided with the full functionality of the online banking website. However, in FIG. 4A, the user is also provided with a second option, namely to provide mobile wallet login credentials (via selecting button 425). Hence, in FIG. 4A, the user is presented with two possible authentication paths, a first authentication path that prompts the user to provide online banking login credentials to gain access to online banking, and a second authentication path that prompts the user to provide mobile wallet login credentials to gain access to the mobile wallet. If the user selects the second authentication path, the user is delivered to the more payment-focused functionality of the mobile wallet.

Figure 4B:
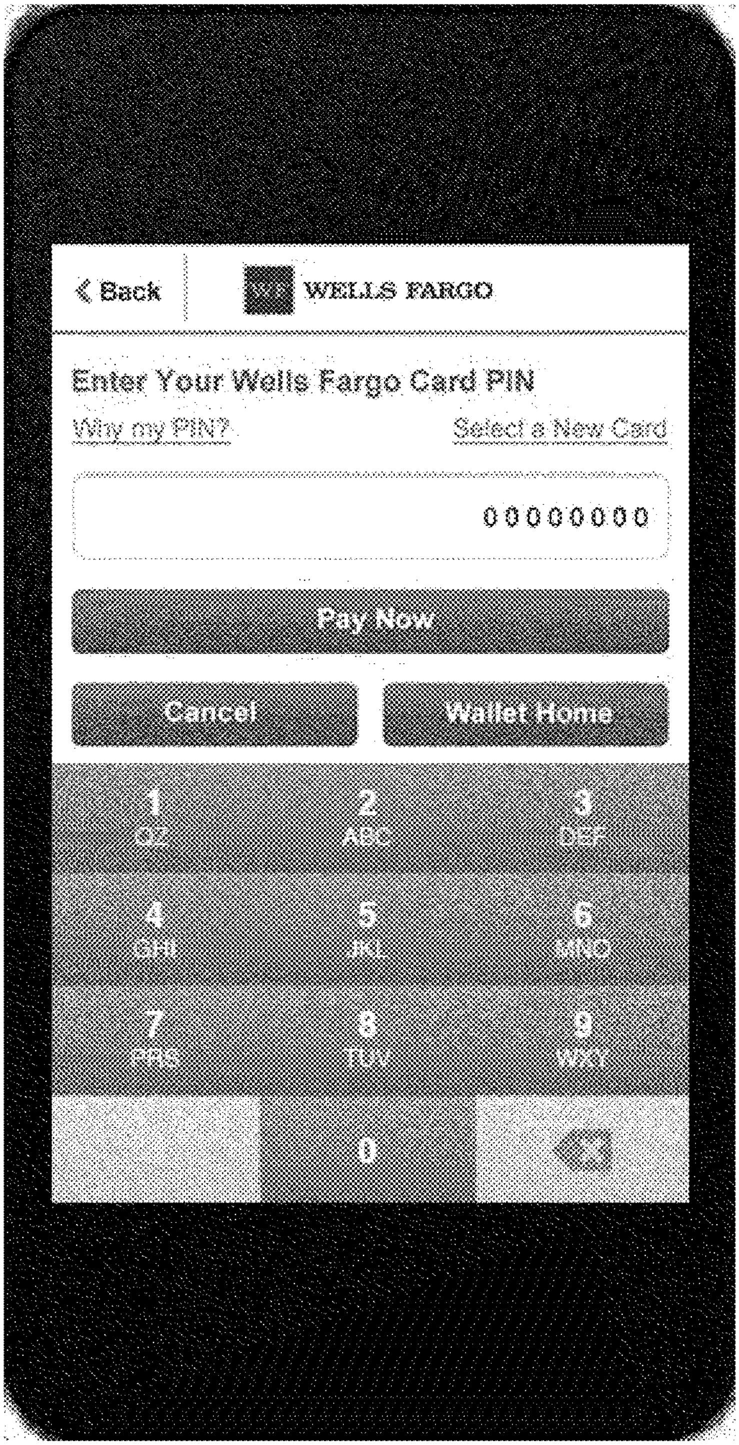

Process 400 includes receiving a PIN from the user (step 402) to authenticate the user (FIG. 4B). At step 402, the mobile wallet client application 116 prompts the user for a PIN that was used during the registration steps in process 300. Hence, as previously indicated, the user may be authenticated based on the user's mobile wallet banking credentials (e.g., 4 digit PIN), rather than being prompted to provide the user's usual online banking authentication credentials (username and password).

In an alternative embodiment, a user may log into a mobile banking session with a source account bank computer system, or the user may directly access the mobile wallet bank computer system. Process 400 further includes allowing the user access to his or her mobile wallet account (step 404). For example, the user may access his or her mobile wallet account through his or her account at the source account bank computer system, or may log into his or her mobile wallet account at the mobile wallet bank computer system by providing a PIN or other identifier to the mobile wallet bank computer system.

Process 400 further includes validating the user based on the customer token and device token (step 406). When the user logs in to access his or her mobile wallet account, the customer token and device token stored on the mobile device (stored during step 310 of process 300) are provided to the mobile wallet bank computer system. The mobile wallet bank computer system 120 validates the user and/or the mobile device for use with the mobile wallet account. Step 406 may further include validating the user based on the PIN or other identifier also provided to the mobile wallet bank computer system 120. For example, in order to be validated, the customer token, the device token, and the PIN may all need to match (i.e., be associated with each other in the mobile wallet computer system 120). As previously indicated, each user may have one customer token and one PIN which together are associated with multiple device tokens (such that the user can access the mobile wallet account from multiple devices).

Process 400 further includes generating a new device token (step 408), and sending the new device token to the mobile device of the user (step 410). Hence, in some embodiments, the device token may change each time the user uses the device. The device token may be a token that will identify the user and the associated mobile device to the mobile wallet bank computer system 120 in the future. More particularly, the device token may identify a current session of the user. In other words, the token may be used to identify a particular function that the user may perform during the session, such as initiating a purchase. The token is encrypted by the mobile wallet bank computer system 120 and provided to the mobile device. The mobile device stores the device token for future use.

Figure 4C:
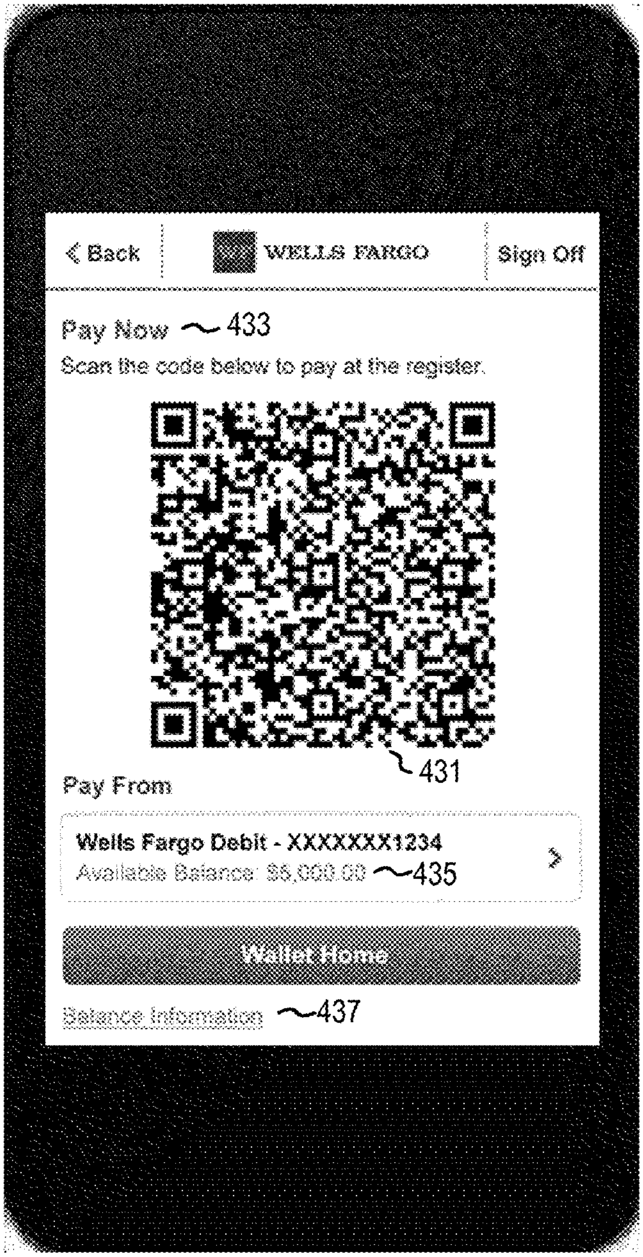
Figure 4D:
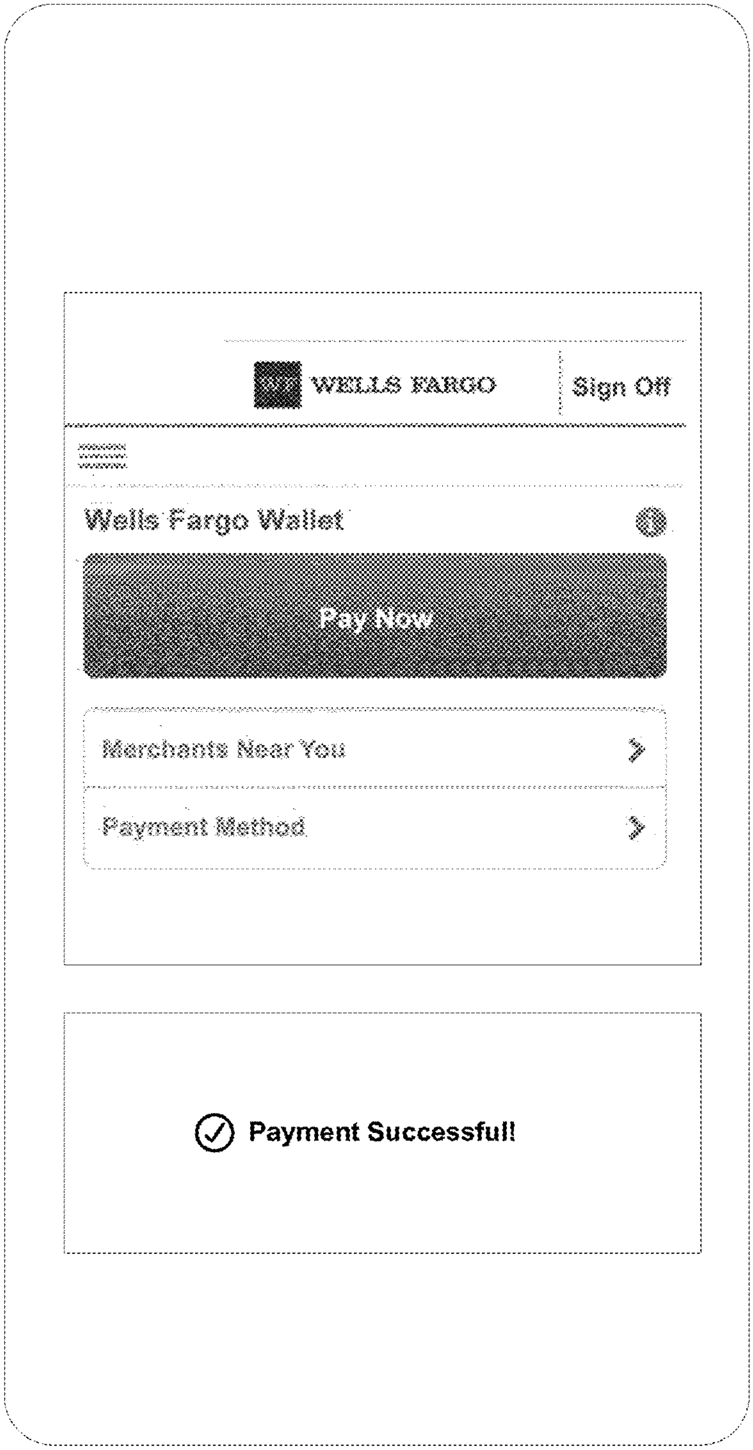

Process 400 further includes receiving an indication that the user wishes to execute a payment or other transaction (step 412). Upon the indication, the mobile wallet bank computer system 120 generates a code (e.g., a QR code) based on the user's default payment method (step 414). For example, FIG. 4C shows a QR code 431. The QR code is generated including a combination of random digits and account information of the user. For example, the QR code may include the last four digits of a debit card or credit card number of an account associated with the user and the request. The account information may be used to identify a source account for the transaction at a later step in the transaction. The mobile wallet bank computer system 120 may use token information (e.g., customer token and device token information) from the mobile device to identify the mobile wallet account and associated source account to use in code generation. The code may provide credit card data or tokenized credit card data in Track 1 or Track 2 format, as described below with reference to FIGS. 5-7. In FIG. 4C, on the same screen as QR code 431 is displayed, a Pay Now button 433 is also displayed. Selection of the Pay Now button 433 is the last input received by the mobile device from the user before the payment is submitted for processing. Upon user selection of the Pay Now button 433, the generated code is then provided as part of a payment token to the merchant or other recipient of the payment or funds for payment processing (step 416) (FIG. 4D).

As previously described in connection with FIGS. 3C and 3F, the user may be provided with information about current account balances. This is shown in FIG. 4C at field 331. The balance information is displayed on the same display screen upon which the Pay Now button 433 is displayed. As previously indicated, the Pay Now button 433 is the last input provided by the user before the payment information (e.g., tokenized card number) is submitted to the merchant computer system 140 for payment processing. Hence, in FIG. 4C, the user is provided with account balance information at the same time the user is making a final decision on whether to select the Pay Now button 433 (i.e., at the same time the user is making a final decision on whether to submit the payment to the merchant). The account balance may be accessed from database 124 or 134 and may reflect all account activity that has posted to the account, even for transactions that are quite recent. After the transaction is complete, another screen display may be generated that shows updated account balance information after the funds are transmitted to the recipient.

If the user is concerned that the account balance would be unacceptably low after the transaction is completed, or if the account has a negative balance, then the user can opt to cancel the transaction or to perform the transaction in a different manner. For example, if the user is a first joint account holder, and a second joint account holder on the same account (e.g., a spouse) makes an unrelated purchase at another store, such account activity may be reflected on a screen display viewed by the user within a short period of time of the purchase by the other joint account holder (e.g., less than one hour, less than ten minutes, less than one minute, etc.). Hence, if the user did not realize how low the account balance is getting, and is concerned that the account balance would be unacceptably low after the transaction is completed, then the user can opt to cancel the transaction or to perform the transaction in a different manner (e.g., using another source account, by adding funds in the default source account, and so on). If the source account is held at the same entity that operates the mobile wallet computer system 120, then the account balance may be obtained without the use of bots or other program logic for performing automated tasks over the Internet. Conversely, if the source account is held at a different entity than the entity that operates the mobile wallet computer system 120, then other mechanisms may be used. For example, two banks may collaborate to establish a protocol for securely exchanging customer account balance information.

Also shown in FIG. 4C is a balance information link 437. By selecting link 437, the user can obtain more detailed balance information and perform related tasks. For example, in some instances, the account balance on the default payment account used by the user may be negative. For example, a demand deposit serving as a source account may be overdrawn or a credit card account serving as a source account may have negative available credit. By selecting link 437, the user may be provided with a new display screen that presents additional information and options for the user. For example, if there is a negative account balance, the user may be provided with a link to select a different account to use as the source account. For example, the user may be provided with a list of other accounts, and be presented with current balance information for each of the other accounts, and be provided with the option to select one of the other accounts to use as the source account. The funds may then be transmitted from the newly selected account. Alternatively, the user may be provided with a link to transfer funds to another account to the default source account. In the case of a credit card account, the user may be provided with a link to pay off all or a portion of the balance of the credit card account.

As previously mentioned in connection with FIG. 3G, in some embodiments, the mobile wallet computer system 120 may be configured to select the source account that is presented to the user as the default payment account. The source account may be selected by the mobile wallet computer system 120 when the user is at the point of sale based on user preferences, account balances, and/or other information. For example, if two accounts have been provisioned to the mobile wallet, such as a demand deposit account and a credit card account, the mobile wallet may select the source account based on current account balances. For example, if the user only has $100 in the demand deposit account, and the proposed transaction is for $250, then the mobile wallet computer system 120 may select the credit card account as the default source account to be presented to the user at the point of sale, because the available account balance of the demand deposit is deemed too low. For example, in this example, using the demand deposit account as the source account would cause the demand deposit account to become overdrawn. In other examples, the user may specify a dollar threshold such that, if a transaction were to cause the account balance to drop below the threshold, the available account balance is deemed too low (even though the transaction would not cause the available account balance to become negative). As another example, if the demand deposit account has a $500 balance, and the credit card has a balance of $9,800 and a credit limit of $10,000, then the mobile wallet computer system 120 may select the demand deposit account as the default source account to be presented to the user at the point of sale, because there is not sufficient credit available on the credit card account to perform the transaction. Again, the user may be provided with the ability to specify a dollar threshold which causes the available credit to be deemed too low (e.g., even though the user has a credit limit of $10,000, the user may want to never have an outstanding balance over $5,000). The user may also be provided with the ability to view account balances and transfer funds, as previously described, such that an account other than the default source account selected by the mobile wallet computer system 120 may be used.

As another example, the mobile wallet computer system 120 may determine rewards information regarding rewards available to the user if the user uses a first potential source account to perform the transaction as compared to if the user uses a second potential source account to perform the transaction. For example, the user may have two credit cards, but one of the credit cards may offer additional rewards points for purchases made at a particular merchant with whom the user is about to conduct a transaction. For example, the credit card may be a closed loop credit card (i.e., a merchant-specific credit card) that offers more rewards points for purchases at that merchant than the open loop credit card (e.g., a Visa card) that is typically used by the user. A screen display may be generated that shows at least one of the first and second rewards information. For example, the screen display may shows a comparison of the available rewards. The default source account may thus be selected based on which credit card offers greater rewards for the particular transaction that the user is about to conduct.

As another example, the mobile wallet computer system 120 may select a default source account based on user preferences. For example, the user may have two credit cards as described above, including a merchant-specific credit card and a Visa credit card. The merchant specific credit card may offer greater rewards but have a higher interest rate than the Visa credit card. A first user may specify a preference for rewards points (e.g., if the user typically pays off the user's credit cards every month). For such a user, the merchant-specific credit card may be selected as the default source account by the mobile wallet computer system 120 when a user is at a point of sale of that merchant. A second user may specify a preference for lower interest rates (e.g., if the user typically does not pay off the user's credit cards every month). For such a user, the open loop credit card may be selected as the default source account by the mobile wallet computer system 120 when a user is at a point of sale of that merchant. As another example, the mobile wallet computer system 120 may perform an analysis of recent payment history of the user to determine whether the user has recently been paying off the user's credit cards and, based on recent payment history, select either the merchant-specific credit card or the open loop credit card for use in a particular transaction.

As another example, a user may have provisioned gift cards to the mobile wallet account. For example, the user may have purchased a $25 virtual gift card using rewards points that the user has earned. At the merchant point of sale, the virtual gift card may then be presented to the user as a default source account.

Other information may also be displayed to the user. For example, if the user has configured budget information through an online banking area of a website of the financial institution, a screen display may be generated that shows the budget information configured by the user (e.g., prior to the user selecting the Pay Now button 433). Again, the budget information may reflect recent transactions performed in connection with the user's accounts.

Referring to FIGS. 5-6, codes that may be sent during operation of the system 100 are shown. As previously indicated, information embedded in the codes may be embedded in a Track 1 format and Track 2. The code may be sent optically as a code or in another manner. As will be appreciated, the code formats shown in FIGS. 5-6 are example code formats that may be used with the systems and methods described herein. In other embodiments, other formats may be used.

The Track 1 format in FIG. 5 is shown to include 76 digits and the Track 2 format in FIG. 6 is shown to include 38 digits. Each format may generally include a format code (digit 1), tokenized primary account number 501 (digits 2-20), a field separator (digit 21), an expiration date 505 (digits 35-38 in Track 1, digits 22-25 in Track 2), a service code (digits 39-41 or 26-28), and a payment token 507 (digits 42-76 or 29-38). Each track may additionally or alternatively include other fields representing different data to be embedded in the code. In one embodiment (the Track 1 format), the credit card data may include a customer name or other customer identifier (e.g., in digits 22-33 of the Track 1 format).

In various embodiments of the present disclosure, account information associated with the user's mobile wallet account may be represented in the code using digits 2 through 20 of the Track 1 or Track 2 format. This is shown in FIGS. 5-6 as the tokenized primary account number (TPAN). Referring also to FIG. 8, the TPAN format is shown in greater detail.

As shown in FIG. 7, the first six digits of the TPAN may represent an issuer identification number (IIN) that is used to route the TPAN to the appropriate mobile wallet bank computer system 120. The IIN is a predetermined number issued to each bank for financial institution for routing fund transfer requests. In the present configuration, an IIN that is associated with the bank that operates the mobile wallet computer system 120 may be used.

Digits 7 through 15 of the TPAN may represent a Trace ID, and digits 16 through 19 may represent account information (e.g., the last four digits of an actual account number, or other account information). First generating random numbers for digits 7 through 14 may create the Trace ID. The Trace ID may be used for verifying and approving a user initiated transaction. Once those digits are determined, then digit 15 may be calculated. Digit 15 is calculated such that digit 19 may be used as the checksum digit of the tokenized card number or the code. In other words, even though digit 19 is fixed (as part of the actual card number of the account), digit 19 may be used as the checksum digit, because digit 15 is calculated in such a way to allow the code to pass the error detection process. Digits 1-19 from FIG. 7 map to digits 2-20 in FIGS. 5 and 6. For example, digits 2-20 of FIGS. 5 and 6 may include the IIN, Trace ID, pseudo check digit, last 4 digits of the card number as shown in FIG. 7.

The checksum digit is used for error detection purposes (e.g., to detect errors in manually inputted data that is included in the code). For example, the checksum digit is used to help detect single digit errors, errors where digits are transposed, twin errors, etc. The checksum digit may then be used in one of several algorithms for checking for errors in the code. It should be appreciated that one of any type of checksum algorithm may be used with the embodiment described herein.

In other embodiments, a digit other than digit 15 may be used as the calculated digit. For example, any eight of the nine digits between digit 7 and 15 may be randomized, and the remaining digit may be used as the "checksum helper" digit (e.g., the digit calculated to make digit 19 the checksum digit).

Referring also to FIG. 8, actual card number is sent in Track 2 format that may be generated at step 810 is shown in greater detail. As compared to the QR code of FIGS. 5-7, the trace ID is moved to digits 26-33, and the actual account number may be provided as digits 2 through 17. In other words, a subset of the original token generated by the mobile wallet bank computer system is moved into a discretionary field of the new generated token. The code is shown to generally include the trace ID and account number, along with an expiration date field (e.g., with the same digits as determined in an earlier process of creating the original token) and a service code field. The code may optionally include any other type of information.

In various embodiments, using the trace ID may allow the financial institution to identify mobile wallet transactions. Upon identifying the mobile wallet transactions, the financial institution may segment the mobile wallet transactions for risk, customer service, security, and card not present transactions. In other embodiments, the transactions that were performed using mobile wallet bank computer system 120 each use a trace identification number and the user may be charged a different fee for such transactions. In various embodiments, when a user of a mobile wallet account loses their credit card or debit card and the financial institution issues the user a new credit card or debit card, the mobile wallet may be able to auto provision the newly issued cards. Auto provisioning may allow the user to use the mobile wallet account prior to receiving and/or activating the credit or debit card. In other embodiments, in the case of mobile wallet fraud, the mobile wallet account of the user may be reset.

A credit card may be used to pay for a transaction at a point of sale location using the physical credit card, known as a credit card present transaction. A credit card may be used when a credit card is not physically located at a merchant location, such as but not limited to, an online merchant transaction where the credit card information is entered in an online transaction. A financial institution may rank the risk of fraud for each type of transaction. In some embodiments, the financial institution may assign a higher risk rating to a credit card that is not present at the merchant location than a credit card present transaction. In various embodiments, a mobile wallet that performs a transaction at a merchant location may be considered more secure than a physical credit card because the mobile wallet does not provide the merchant the actual credit card number and the mobile wallet does not have the actual credit card number. Accordingly, the financial institution may determine that a transaction was a mobile wallet transaction based on the trace ID and rate the transaction to be more secure or fraud resistant than card present transaction. The financial institution may create a new risk rating that is of a lower risk for mobile wallet transactions. In some embodiments, the transactions that are performed using a mobile wallet may be charged different fee because of the risk rating. In various embodiments, due to the reduction of risk the mobile wallet transactions may be charged a lower fee than card present or card not present transactions.

Figure 9:
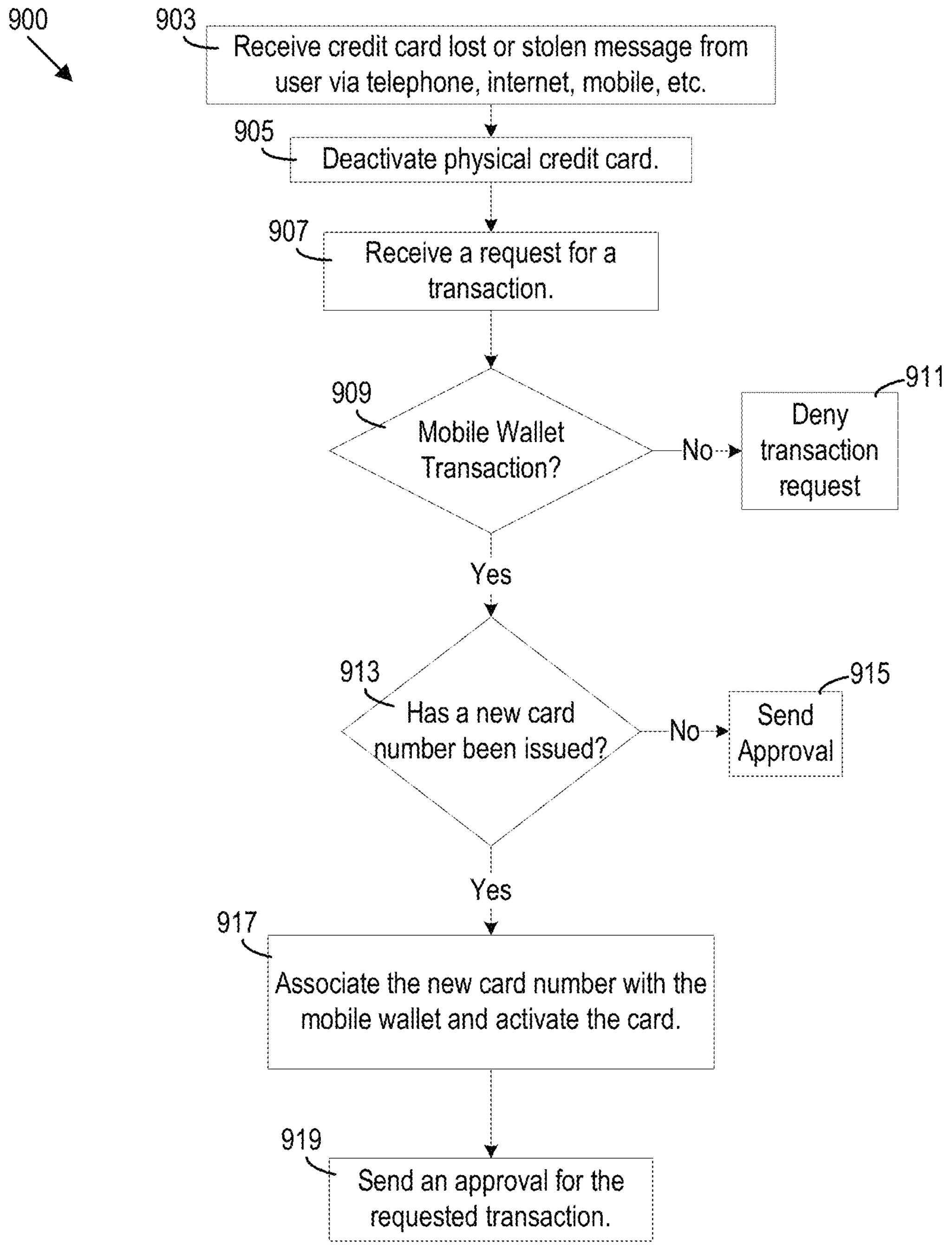
FIG. 9 illustrates a process that may be implemented by the system in FIG. 1 according to an example embodiment.

FIG. 9 illustrates a process 900 that may be implemented by the system in FIG. 1. In various embodiments, process 900 may be used when an account holder reports their physical card lost or stolen via telephone, Internet, mobile device, etc. In some embodiments, process 900 may allow the account holder to perform one or more transactions using the mobile wallet stored on a mobile device, even after the physical card has been lost or stolen. Some advantages of process 900 may include the account retaining the use of the account even after the loss of a physical card. Additional advantages may include the account holder being able to activate the newly issued replacement card by using the mobile wallet functionality.

At step 903, the financial institution computer system may receive a message from the user that the physical card is lost or stolen. In various embodiments, the account holder may contact the financial institution computer system using various communication methods, such as but not limited to, telephone, Internet, and mobile device. Upon receiving the message from the account holder that the physical card is lost or stolen, the financial institution computer system may ask the account holder whether the mobile wallet account has also been compromised. After receiving input from the account holder that the mobile wallet account holder has not been compromised, the financial institution computer system may deactivate the physical card account, at step 905. In some embodiments, the financial institution computer system may assign the uncompromised mobile wallet account to a temporary account to allow the account holder to conduct transactions using the mobile wallet.

In various embodiments, the financial institution computer system may receive a request for a transaction from a merchant, at step 907. At step 909, the financial institution computer system determines whether the transaction is being performed by a mobile wallet or whether the transaction is being performed by the physical card information. Since the mobile wallet transaction is performed using at least a trace ID, the financial institution computer system may differentiate between the mobile wallet transaction and the physical card information transaction.

Upon determining that the transaction request is not from a mobile wallet or is using the actual card information, the financial institution computer system may deny the transaction request, at step 911. The financial institution computer system would be able to avoid any fraudulent transactions using the actual card information by denying the transaction request that did not originate from a mobile wallet associated with the account.

When the financial institution computer system determines that the transaction request originated from a mobile wallet account, the financial institution may determine whether a new replacement card number has been issued to the account holder at step 913. If a new replacement card number has not been issued, the financial institution may approve the transaction at step 915 based on the determination that the transaction is a mobile wallet transaction and based on the fact that the mobile wallet account has not been compromised. In some embodiments, the transaction may be approved using the temporary card number discussed above.

In various embodiments, when the financial institution has issued a new card, but account holder has not activated the physical card because the account holder has not received the card or other reasons, the financial institution may update its records with respect to the mobile wallet. For example, at step 917, the financial institution computer system may update its records to associate the new card number with the mobile wallet account of the previous card number at step 917. After step 917, the financial institution may send an approval for the transaction request at step 919. In other embodiments, the mobile wallet client application on the mobile device 110 may prompt the user to activate the card prior to the user having received the physical card. In other embodiments, even after receiving the card the account holder may wish to activate the card via the mobile wallet application. Activating the card by the account holder, may update the financial institution settings to associate the new card number with the mobile wallet account number.

Figure 10:
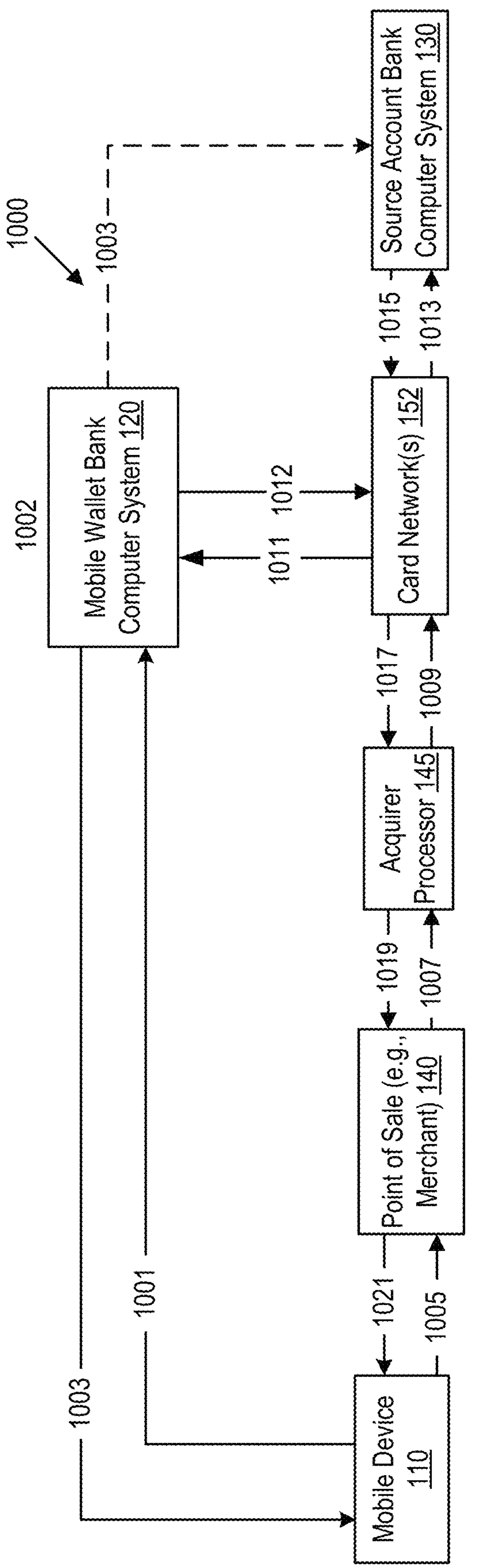
FIG. 10 illustrates a payment process that may be implemented by the system in FIG. 1 according to an example embodiment.

FIG. 10 illustrates a payment process that may be implemented by the system in FIG. 1 according to an example embodiment. Except as otherwise described below, the payment process of FIG. 10 is the same as the payment process of FIG. 2. Hence, the above discussion with respect to FIG. 2 applies to FIG. 10 as well, except as otherwise described below.

In the embodiment of FIG. 10, rather than providing the substitute card number to the mobile wallet computer system 120 (as in FIG. 2), the acquirer processor computer system 145 provides the substitute card number to a card network computer system 152. Hence, a tokenized card number may be generated and ultimately delivered to the acquirer processor computer system 145 at steps 1001, 1003, 1005, 1007 in the manner described above in connection with steps 201, 203, 205, 207.

Next, at step 1009, the acquirer processor computer system 145 sends the tokenized card number to the card network computer system 152. Next, at step 1011, the card network computer system 152 sends the tokenized card number to the mobile wallet bank computer system 120. After receiving the request from the card network computer system 152, the mobile wallet bank computer system 120 may determine the actual card number and send the actual card number back to the acquirer processor at step 1012. In one embodiment, the determination of the actual card number may occur by searching for the account information associated with the payment token and/or trace ID within the tokenized card number. Additionally, the trace ID from the tokenized card number may be sent with the actual card number at step 1012, similar to step 211. Again, at this point, the issuer discretionary field is no longer needed for the payment token, hence, the trace ID may be sent to the acquirer processor computer system 145 in the issuer discretionary field.

At step 1013, the card network computer system 152 sends the actual card number and the trace ID to the source account computer system 130 for processing a payment. The source account bank computer 130 may retrieve the trace ID that was received from the mobile wallet bank computer system 120 by searching for the actual card number that was received from the payment system 150. The source account bank computer 130 may compare the trace ID that was received/stored at step 1003 with the trace ID that was received from the payment system 150 at step 1013. Assuming there is a match, the source account bank computer 130 may issue an approval for the transaction. After verifying the actual card number and the trace ID in the issuer discretionary field, the source account bank computer system 130 may send an approval to the payment system 150 at step 1015. Steps 1017, 1019, and 1021 may be performed in the same manner as discussed above in connection with steps 217, 219, and 221.

As discussed above in connection with FIG. 2, the use of the payment token and trace ID as described herein allows for two levels of authentication. The payment token is generated by the mobile wallet computer system at step 1002. The payment token is then transmitted to the mobile device 110, then to the merchant computer system 140, then to the acquirer processor computer system 145, then to the card network computer system 152, and eventually back to the mobile wallet computer system 120 where it is matched with the original payment token generated at step 1002. Similarly, the Trace ID is also generated by the mobile wallet computer system at step 1002, and then transmitted to the mobile device 110, then to the merchant computer system 140, then to the acquirer processor computer system 145, then to the card network computer system 152, and eventually back to the mobile wallet computer system 120 where it is matched with the Trace ID generated at step 1002. In the case of the Trace ID, however, the Trace ID is then further transmitted back to the payment system 150, and then to the source account computer system 130 where it is matched with the Trace ID generated at step 1002. Accordingly, the trace ID used in conjunction with the tokenized credit card number allows both the mobile wallet bank computer system 140 and the source account bank computer system 130 to authenticate the transaction. Using the trace ID in the above described manner may permit the source account bank computer system 130 and the mobile wallet bank computer system 120 to verify the trace ID at least twice prior to approving a transaction and transferring funds. Further, as previously discussed, the trace ID may be used by the source account computer system 130 to determine whether the credit card transaction was a mobile wallet transaction (e.g., as opposed to an in-person card-present transaction involving use of the user's physical credit card, as opposed to an online transaction, and so on). In other embodiments, the mobile wallet computer system 120 generates a tokenized card number, but does not embed a trace ID in the tokenized card number.

In some embodiments, instead of embedding the trace ID in a tokenized credit card account number at step 1002, the actual credit card number is transmitted to the mobile device 110 and the merchant computer system 140. In such an embodiment, the trace ID may be included in the issuer discretionary field at step 1002, and the payment token may be communicated in another manner or another payment matching mechanism may be used. The trace ID may be stored in the issuer discretionary field and may travel though the payment processing system, until it is verified by the source account bank computer system 130. After being verified by the source account bank computer system 130, the transaction may be approved and the funds may be transferred from the source account bank computer system to the acquirer processor computer system 145. In other embodiments, the same financial institution may own the source account bank computer system 130 and the mobile wallet bank computer system 120. Hence, as previously described in connection with the discussion of FIG. 2, the tokenized card account number and trace ID features may each be used alone or in combination with each other.

Figure 11:
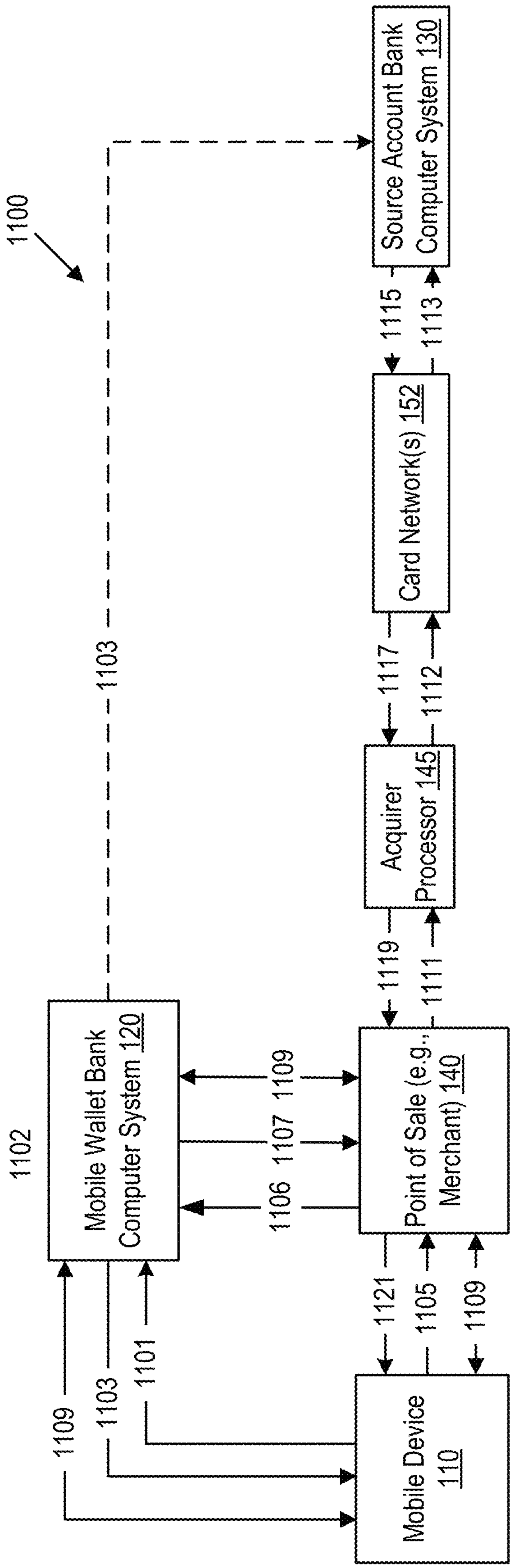
FIG. 11 illustrates a payment process that may be implemented by the system in FIG. 1 according to an example embodiment.

FIG. 11 illustrates a payment process that may be implemented by the system in FIG. 1 according to an example embodiment. Except as otherwise described below, the payment process of FIG. 11 is the same as the payment process of FIG. 2. Hence, the above discussion with respect to FIG. 2 applies to FIG. 11 as well, except as otherwise described below.

In the embodiment of FIG. 11, rather than providing the substitute card number to the acquirer processor computer system 145 (as in FIG. 2), the merchant computer system 140 provides the substitute card number to the mobile wallet computer system 120. Hence, a tokenized card number may be generated and ultimately delivered to the merchant computer system 145 at steps 1101, 1103, 1105 in the manner described above in connection with steps 201, 203, 205.

Next, at step 1106, the merchant computer system 140 sends the tokenized card number to the mobile wallet computer system 120. After receiving the tokenized card number from the merchant computer system 140, the mobile wallet bank computer system 120 may determine the actual card number and send the actual card number back to the merchant computer system 140 at step 1107. In one embodiment, the determination of the actual card number may occur by searching for the account information associated with the payment token and/or trace ID within the tokenized card number. Additionally, the trace ID from the tokenized card number may be sent with the actual card number at step 1107, similar to step 211. Again, at this point, the issuer discretionary field is no longer needed for the payment token, hence, the trace ID may be sent to the acquirer processor computer system 145 in the issuer discretionary field.

At step 1111, the merchant computer system 140 sends the actual card number and the trace ID to the acquirer processor computer system 145. At step 1112, the acquirer processor system 145 sends the actual card number and the trace ID to the card network computer system 152. At step 1113, the card network computer system 152 sends the actual card number and the trace ID to the source account computer system 130 for processing a payment. The source account bank computer 130 may retrieve the trace ID that was received from the mobile wallet bank computer system 120 by searching for the actual card number that was received from the payment system 150. The source account bank computer 130 may compare the trace ID that was received/stored at step 1103 with the trace ID that was received from the payment system 150 at step 1113. Assuming there is a match, the source account bank computer 130 may issue an approval for the transaction. After verifying the actual card number and the trace ID in the issuer discretionary field, the source account bank computer system 130 may send an approval to the payment system 150 at step 1115. Steps 1117, 1119, and 1121 may be performed in the same manner as discussed above in connection with steps 217, 219, and 221.

In the same manner as discussed above in connection with FIG. 2, the use of the payment token and trace ID as described herein allows for two levels of authentication. Specifically, the payment token generated by the mobile wallet computer system at step 1102 is matched with the payment token received by the mobile wallet computer system at step 1107. Additionally, the Trace ID generated by the mobile wallet computer system 120 at step 1002 is matched by the mobile wallet computer system 120 with the Trace ID received at step 1107 and is also matched by the source account computer system 130 with the Trace ID received at step 1113. Also, as previously described in connection with the discussion of FIGS. 2 and 10, the tokenized card account number and trace ID features may each be used alone or in combination with each other.

Also shown in FIG. 11 is step 1109. In some embodiments, at step 1109, the mobile device 110, the mobile wallet computer system 120, and the merchant computer system 140 interact to facilitate redemption of the merchant rewards points. Such an arrangement may allow the rewards information to be available at the point of sale (i.e., at the time and location of the transaction), such that the impact on the transaction of redeeming such rewards may be presented to the user at the point of sale and prior to when the purchase is made. For example, if the user has $25 in merchant rewards points, settlement of the rewards points may occur entirely at the point of sale (i.e., the $25 may be deducted from the transaction at the point of sale), rather than only appearing as a credit at a later point in time on an account statement. Additionally, the settlement may occur at the point of sale even though the user does not have a physical rewards card (e.g., gift card, prepaid card) to provide the merchant at the point of sale.

For example, in a scenario where the source account is held at the same entity that operates the mobile wallet computer system 120, the mobile wallet computer system 120 may have information about rewards that have been earned by the user. For example, the user may earn cash back rewards for use of a credit card that are calculated as a percentage of credit card transactions. The mobile wallet bank may then partner with merchants to provide rewards offers to the user. For example, the user may be provided with an offer to purchase a $25 virtual gift card at a local merchant for $22.50 in rewards points. The virtual gift card may be $25 in merchant rewards points that the user can access, e.g., through the mobile wallet, but wherein no physical gift card issued. If the user accepts such an offer, then the fact that the user has a $25 virtual gift card available to spend may be information that is stored in the mobile wallet computer system 120. As another example, the user may earn rewards from the merchant as a percentage of purchases made at the merchant. Such rewards information may be communicated to the mobile wallet computer system 120 by the merchant computer system 120. For example, the $25 virtual gift card may be automatically presented to the user as a default source account when the user is at the merchant point of sale. As another example, if the source account is held at a different entity than the entity that operates the mobile wallet computer system 120, then other mechanisms may be used to obtain such rewards information from the source account bank (e.g., bots, a secure exchange protocol established through collaboration of the two banks, etc.).

Subsequently, at the point of sale, the mobile wallet bank computer system 120 may determine whether the user has any rewards available for the merchant with whom the transaction is being conducted. Alternatively, if the user does not have any rewards with the merchant, the mobile wallet computer system 120 may initiate a direct communication with the mobile device 110 to inquire whether the user would like to purchase any rewards points at the point of sale. Hence, the user may be provided with the opportunity to purchase merchant rewards points while at the merchant point of sale, and then immediately use those rewards points while the user is still at the merchant point of sale.

Assuming the user has rewards points that may be used with the mobile device 110, the mobile wallet computer system 120 and the merchant computer system 140 may then interact to facilitate redemption of the merchant rewards points. This interaction is shown generally at 1109. As will be appreciated, the particular manner in which the mobile device 110, the mobile wallet computer system 120 and the merchant computer system 140 interact in this regard may vary according to various embodiments. As will also be appreciated, and as with the other steps shown in the figures, the timing and sequencing of step 1109 relative to the other steps may vary according various embodiments.

For example, in some embodiments, step 1109 is performed after step 1107. For example, the tokenized card number may initially be submitted to the mobile wallet computer system 120 after the Pay Now button 433 (FIG. 4C) is selected by the user. After the mobile wallet computer system 120 determines that there are available rewards, and communicates this information to the merchant computer system 140, the merchant computer system 140 may then interact with the mobile device 110. For example, the merchant computer system 140 may prompt the user via a screen display with a statement such as the following: "You have $25 in merchant rewards available to use for your purchase? Would you like to redeem your rewards now?" Assuming the user answers affirmatively, then the merchant computer system 140 may apply the $25 merchant rewards points to the transaction, and submit the updated transaction (having a reduced transaction amount) to the acquirer processor computer system 145. As another example, the user may select via a display screen on the mobile device 110 to have only a portion (e.g. $10) of the available rewards applied to the transaction. As another example, the mobile wallet computer system 120 may provide the prompt to the user. Upon the user answering affirmatively, the mobile wallet computer system 120 may provide information about the rewards points redemption to the merchant computer system 140 (e.g., the fact that the user has merchant rewards points and the amount of the points). As another example, the rewards information may be communicated from the mobile device 110 to the merchant computer system 140, and then validated later by the merchant computer system 140 and/or the mobile wallet computer system 120.

As another example, in some embodiments, step 1109 may be performed before step 1105. For example, at step 1101, when the mobile device 110 requests access to funds in the mobile wallet via the mobile wallet bank computer system 120, the mobile device 110 may also provide the mobile wallet computer system 120 with the geolocation of the user. Based on the geolocation, the mobile wallet computer system 120 may identify the merchant with whom the user is attempting to conduct a transaction. The mobile wallet computer system 120 may then determine whether merchant rewards points are available and prompt to the user whether the user wishes to utilize the merchant rewards points. Then, at step 1105, in addition to communicating the tokenized card number, the mobile device 110 may also communicate information about the dollar value of the merchant rewards points to be redeemed. In some embodiments, the user is not prompted regarding whether the user wishes to utilize the merchant rewards points, rather, the merchant rewards points are redeemed automatically without additional user input.

When the transaction is complete, the user may be provided with information regarding the redemption of the rewards points. For example, a screen display may be generated that shows a first total transaction amount before the merchant rewards are applied and a second total transaction amount after the merchant rewards are applied. The merchant computer system 140 may also generate a receipt for the transaction and transmit the receipt to the mobile device 110 for display to the user. The receipt may show application of the rewards to the transaction.

For example, if the original transaction amount was $75.45, and the user had $25 in rewards, the receipt will reflect a transaction amount of $50.45 and not 75.45, even though no physical rewards card is presented to the merchant. Additionally, the transaction amount submitted to the card network computer system 152 is $50.45 and not $75.45 (rather than $75.45 being submitted and final settlement of the rewards points occurring at a later point in time). Additionally, on the user's account statement, the user will see only a debit for $50.45 on the date of the purchase, rather than a debit of $75.45 on the date of the purchase followed by a credit of $25 at a later date.

In one embodiment, the merchant computer system 140 comprises a smart point of sale device (e.g., Clover, Square, Revel Systems, Poynt, etc.). Such a device may be built on an Android-based or other platform and may provide third-party software developers (such as banks) with the ability to provide custom applications available to merchants through an "app store"). Such a device may be connected to the internet and may be configured to permit over-the-air updates performed, such that new functionality can be downloaded on a regular basis. In other embodiments, other POS computer system platforms may be utilized.

In the embodiment of FIG. 11, the merchant computer system 140 sends the tokenized card number to the mobile wallet computer system 120 at step 1106. As will be appreciated, in other embodiments, the merchant computer system 140 may interact with the mobile wallet computer system 140 and the mobile device 110 as described above in FIG. 11 in connection with rewards information, but the tokenized card number may be sent to the mobile wallet computer system by the acquirer processor computer system 145 (as described in connection with FIG. 2) or by the card network computer system 152 (as described in connection with FIG. 10).

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method, comprising:

receiving, by a computer system from a mobile device of a user, an indication from the user regarding a transaction and a user-defined parameter;

automatically selecting, by the computer system based on the user-defined parameter and the indication from the user, a first account of the user for the transaction;

generating, by the computer system in response to the automatic selection of the first account for the transaction, a dynamic code associated with the first account, including generating a tokenized identifier using payment information associated with the first account to include in the dynamic code and embedding a unique transaction identifier associated with the transaction into the dynamic code;

transmitting, by the computer system and via a first wireless transmission, the dynamic code to the mobile device, wherein the dynamic code is configured to be received by a computing system associated with the transaction via a second wireless transmission from the mobile device to the computing system:

determining, by the computer system, that the transaction causes a value of the first account to decrease below a user-defined value corresponding to a minimum value of the first account, the determination based on account balance information for the first account received from a database of a second computing system;

based on the determination by the computer system that the transaction causes the value to decrease below the user-defined value, generating, by the computer system, a screen display, the screen display including a link associated with a second account of the user and account balance information for the second account;

providing, by the computer system, the screen display to the mobile device of the user;

receiving, by the computer system, a selection of the link associated with the second account;

based on receiving the selection of the link associated with the second account, facilitating, by the computer system, a transfer of an amount of funds from the second account to the first account;

in response to the transfer of the amount of funds from the second account to the first account, facilitating, by the computer system, the transaction based on receiving the dynamic code from the computing system via a third wireless transmission, wherein facilitating the transaction includes authenticating the transaction based on a determination that the dynamic code received from the computing system matches the dynamic code generated by the computer system and enabling the transaction using the payment information associated with the tokenized identifier in the dynamic code; and updating, by the computer system, the account balance information for the first account and the account balance information for the second account in the database of the second computing system responsive to the transaction.

2. The method of claim 1, wherein the value is an available credit of the first account, and wherein the user-defined value corresponding to the minimum value of the first account is a minimum available credit of the first account.

3. The method of claim 1, wherein the value is an account balance of the first account, and wherein the user-defined value corresponding to the minimum value of the first account is a minimum account balance of the first account.

4. The method of claim 1, wherein the dynamic code is an optical code, the method further comprising:

transmitting, by the computer system, the optical code to the mobile device for the transaction.

5. The method of claim 1, wherein updating the account balance information for the first account and the second account in the database includes dynamically determining, by the computer system, updated account balance information based on at least one transaction involving the first account and the second account prior to facilitating the transfer of the amount of funds.

6. The method of claim 1, wherein the first account and the second account are deposit accounts of the user.

7. The method of claim 1, further comprising:

receiving, by the computer system via a second screen display, the user-defined value and the user-defined parameter, the user-defined parameter associated with a preference of the user to maximize rewards associated with transactions of the user.

8. The method of claim 1, further comprising:

receiving, by the computer system via a second screen display, the user-defined value and the user-defined parameter, the user-defined parameter associated with a preference of the user to minimize an interest rate associated with transactions of the user.

9. A computing system, comprising:

one or more processors; and non-transitory machine-readable media storing instructions that, when executed by the one or more processors, cause the one or more processors to perform operations comprising:

receiving, from a mobile device of a user, an indication from the user regarding a transaction and a user-defined parameter;

automatically selecting, based on the user-defined parameter and the indication from the user, a first account of the user for the transaction;

generating, in response to the automatic selection of the first account for the transaction, a dynamic code associated with the first account, including generating a tokenized identifier using payment information associated with the first account to include in the dynamic code and embedding a unique transaction identifier associated with the transaction into the dynamic code;

transmitting, via a first wireless transmission, the dynamic code to the mobile device, wherein the dynamic code is configured to be received by a computing system associated with the transaction via a second wireless transmission from the mobile device to the computing system;

determining that the transaction causes a value of the first account to decrease below a user-defined value corresponding to a minimum value of the first account, the determination based on account balance information for the first account received from a database of a second computing system;

generating, based on the determination that the transaction causes the value to decrease below the user-defined value corresponding to the minimum value of the first account, a screen display including a link associated with a second account of the user and account balance information for the second account;

providing the screen display to the mobile device of the user;

receiving a selection of the link associated with the second account;

facilitating, based on receiving the selection of the link associated with the second account, a transfer of an amount of funds from the second account to the first account;

facilitating, in response to the transfer of the amount of funds from the second account to the first account, the transaction based on receiving the dynamic code from the computing system via a third wireless transmission, wherein facilitating the transaction includes authenticating the transaction based on a determination that the dynamic code received from the computing system matches the dynamic code generated by the computer system and enabling the transaction using the payment information associated with the tokenized identifier in the dynamic code; and updating the account balance information for the first account and the account balance information for the second account in the database of the second computing system responsive to the transaction.

10. The computing system of claim 9, wherein the value is an available credit of the first account, and wherein the user-defined value corresponding to the minimum value of the first account is a minimum available credit of the first account.

11. The computing system of claim 9, wherein the value is an account balance of the first account, and wherein the user-defined value corresponding to the minimum value of the first account is a minimum account balance of the first account.

12. The computing system of claim 9, wherein the dynamic code is an optical code, the operations further comprising:

transmitting the optical code to the mobile device for the transaction.

13. The computing system of claim 9, the operations further comprising:

receiving, via a second screen display, the user-defined value and the user-defined parameter, the user-defined parameter associated with a preference of the user to maximize rewards associated with transactions of the user.

14. The computing system of claim 9, the operations further comprising:

receiving, via a second screen display, the user-defined value and the user-defined parameter, the user-defined parameter associated with a preference of the user to minimize an interest rate associated with transactions of the user.

15. A non-transitory computer-readable medium comprising instructions therein that, when executed by one or more processors, cause the one or more processors to perform operations comprising:

receiving, from a mobile device of a user, an indication from the user regarding a transaction and a user-defined parameter;

automatically selecting, based on the received user-defined parameter and the indication from the user, a first account of the user for the transaction;

generating, in response to the automatic selection of the first account for the transaction, a dynamic code associated with the first account, including generating a tokenized identifier using payment information associated with the first account to include in the dynamic code and embedding a unique transaction identifier associated with the transaction into the dynamic code;

transmitting, via a first wireless transmission, the dynamic code to the mobile device, wherein the dynamic code is configured to be received by a computing system associated with the transaction via a second wireless transmission from the mobile device to the computing system;

determining that the transaction causes a value of the first account to decrease below a user-defined value corresponding to a minimum value of the first account, the determination based on account balance information for the first account received from a database of a second computing system;

generating, based on the determination that the transaction causes the value to decrease below the user-defined value, a screen display including a link associated with a second account of the user and account balance information for the second account;

providing the screen display to the mobile device of the user;

receiving a selection of the link associated with the second account;

facilitating, based on receiving the selection of the link associated with the second account, a transfer of an amount of funds from the second account to the first account;

facilitating, in response to the transfer of the amount of funds from the second account to the first account, the transaction based on receiving the dynamic code from the computing system via a subsequent wireless transmission, wherein facilitating the transaction includes authenticating the transaction based on a determination that the dynamic code received from the computing system matches the dynamic code generated by the computer system and enabling the transaction using the payment information associated with the tokenized identifier in the dynamic code; and updating the account balance information for the first account and the account balance information for the second account in the database of the second computing system responsive to the transaction.

16. The non-transitory computer-readable medium of claim 15, wherein the value is an available credit of the first account, and wherein the user-defined value corresponding to the minimum value of the first account is a minimum available credit of the first account.

17. The non-transitory computer-readable medium of claim 15, wherein the value is an account balance of the first account, and wherein the user-defined value corresponding to the minimum value of the first account is a minimum account balance of the first account.

18. The non-transitory computer-readable medium of claim 15, wherein the dynamic code is an optical code, the operations further comprising:

transmitting the optical code to the mobile device for the transaction.

19. The non-transitory computer-readable medium of claim 15, the operations further comprising:

receiving, via a second screen display, the user-defined value and the user-defined parameter, the user-defined parameter associated with a preference of the user to maximize rewards associated with transactions of the user.

20. The non-transitory computer-readable medium of claim 15, the operations further comprising:

receiving, via a second screen display, the user-defined value and the user-defined parameter, the user-defined parameter associated with a preference of the user to minimize an interest rate associated with transactions of the user.

* * * * *